US008799182B2

(12) United States Patent
Atkins et al.

(10) Patent No.: US 8,799,182 B2
(45) Date of Patent: Aug. 5, 2014

(54) FUEL DELIVERY COST ESTIMATION SYSTEM

(75) Inventors: Kristopher E. Atkins, Huntington Beach, CA (US); Richard Gordon Cline, La Mirada, CA (US); Brent E. Barrett, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 341 days.

(21) Appl. No.: 13/093,061

(22) Filed: Apr. 25, 2011

(65) Prior Publication Data
US 2012/0271778 A1 Oct. 25, 2012

(51) Int. Cl.
*G06F 17/00* (2006.01)
*G06Q 10/00* (2012.01)
(52) U.S. Cl.
USPC .......................................... 705/400; 705/7.23
(58) Field of Classification Search
CPC ... G06Q 10/02; G06Q 10/025; G06Q 10/047; G06Q 10/0637; G06Q 10/06375; G06Q 50/28; G06Q 10/08355; G06Q 30/0283; G06Q 10/0834
USPC .............. 705/1.1, 5, 6, 7.11, 7.12, 7.13, 7.23, 705/7.36, 7.37, 330–342, 400; 701/117, 701/532
See application file for complete search history.

(56) References Cited

U.S. PATENT DOCUMENTS

| 5,880,958 | A | * | 3/1999 | Helms et al. ................... 701/117 |
| 2004/0107110 | A1 | * | 6/2004 | Gottlieb et al. ................... 705/1 |
| 2008/0133178 | A1 | * | 6/2008 | Byrne et al. ................... 702/184 |
| 2010/0287073 | A1 | * | 11/2010 | Kocis et al. ...................... 705/28 |
| 2011/0251782 | A1 | * | 10/2011 | Perkins et al. ................. 701/123 |

OTHER PUBLICATIONS

"Draft Fully Burdened Cost of Fuel (FBCF) Calculator", Acquisition Community Connection, retrieved Apr. 18, 2011, 1 page.
"AEPI Report—Sustain the Mission Project: Energy and Water Costing Methodology and Decision Support Tool Final Technical Report", Army Environmental Policy Institute, Jul. 2008, pp. 1-45.

* cited by examiner

*Primary Examiner* — Igor Borissov
(74) *Attorney, Agent, or Firm* — Yee & Associates, P.C.

(57) ABSTRACT

A method and apparatus for estimating a cost for moving fuel. A group of vehicles for moving the fuel from a starting location to a destination location is formed using user input. Operations for moving the fuel from the starting location to the destination location are identified using the user input. A set of additional vehicles for the group of vehicles is identified to form a current group of vehicles. Personnel for the current group of vehicles are identified. The cost for moving the fuel from the starting location to the destination location is identified using the current group of vehicles and the personnel.

19 Claims, 15 Drawing Sheets

FIG. 7

Vehicle Name: KC-135R
Description: KC-135 Stratotanker

Select Domain: Air — 702
Select Role: Tanker — 704 — 700 708
Select Family: Stratotanker — 706

Leave Box Blank — or

Vehicle Characteristics

| | | Units |
|---|---|---|
| Empty Weight | 119,212 | pounds |
| Gross Weight | 322,500 | pounds |
| Cruise Speed | 530 | mph |
| Range | 4,603 | miles |
| Standard Crew | 4 | persons |
| Size of Fuel Tank | 17,978 | gallons |
| Storage Capacity | 13,222 | gallons |
| Frontal Area | | ft² |
| CD | | |
| Engine Efficiency | | % factor (0-1) |

Fuel Burn Rate: 2,070.00 Gallons per Hour — 712 714
Vehicle Fuel Type: JP8 — 710 716

Suggested Values Based on Empty Wt.

Cost Components (FY 2009 $)

| | | Units | Suggested Values Based on Empty Wt. |
|---|---|---|---|
| Ops & Maintenance | $8,849.00 | $ per Hour | No Suggestion |
| Crew Pay | $190.00 | $ per Hour | No Suggestion |
| Miscellaneous pHour | | $ per Hour | No Suggestion |
| Miscellaneous pMile | | $ per Mile | No Suggestion |
| Cost Help | Select a Cost Classification | | |

Clear All Fields — Save to User Vehicle List

Data for yellow cells is required before save — Boeing Proprietary

Airbus Tanker Proposal
User Vehicle List

A330-202_user
B767-200ER_user
RG-31Mk5_50%_user

718

Edit Vehicle — Delete Vehicle

KC-135 Stratotanker
Database List

C-130H
C-141B
C-141C
C-17A
C-20
C-20B
C-20C
C-21A
C-23
C-2A
C-5A
C-5B
C-5C
C-9A
CH-46E
CH-47D
CH-53D
CH-53E
FA-18E
FA-18F
KC-10A
KC-130F
KC-130J
KC-130R
KC-135R
KC-135T

720

Edit Vehicle — Update Database

ToPOFF - Total Price Of Fueling Forces - v2.0

| Fuel Delivered (gal) | 40,000 |
| Fuel Type Delivered | Diesel |

Fuel Commodity Prices ($/gal)

| Marine Diesel | $3.00 |
| Auto Diesel | $3.00 |
| Gasoline | $3.00 |
| JP-8 | $3.00 |

| Calendar Year | 2010 |
| Terrain Type | Asphalt |

FBCF $ per Gallon Breakdown

| | $/Gallon |
|---|---|
| Transport | $1.03 |
| Protection | $6.29 |
| Support | $0.26 |
| Envir. Tax | $0.10 |
| Commodity | $3.00 |

Mission Details

| Mission Phase # | 3 |
| Mission Phase Name | FOB Orgun E to BCT |
| Transit Duration | 25 Miles or 0 Hours |

| Transport Option | BSB_Convoy |
| Transport Speed (mph) | 20 |

Transport Characteristics

Transport: HEMTT SERIES (x 16)
Transport: JERRV (x 4)
Transport: AH-64A (x 2)

| Estimated Range | 300 miles |
| Cruise Speed | 50 mph |
| Fuel Storage Capacity | 40,000 gal |
| Tank Size: Marine Diesel | 0 gal |
| Tank Size: Auto Diesel | 2,784 gal |
| Tank Size: Gasoline | 0 gal |
| Tank Size: JP-8 | 750 gal |

Consumption

| Fuel Usage | M Diesel | A Diesel | Gasoline | JP-8/JP-5 |
|---|---|---|---|---|
| Used | 0 gal | 40,357 gal | 0 gal | 1,050 gal |
| Loaded | 0 gal | 42,784 gal | 0 gal | 1,500 gal |
| % of Available Used | 0.0% | 94.3% | 0.0% | 70.0% |
| % of Capacity Used | 0.0% | 100.0% | 0.0% | 200.0% |

Enroute Activities

| Transit (miles) | 25 |
| Transit (hours) | 0 |
| Load (gallons) | 40,000 |
| Unload (gallons) | 40,000 |
| Hold/Orbit (hours) | 0.00 |
| Reload/Rest (hours) | 0.00 |
| Reserve (%) | 0 |
| Reserve (hours) | 0.00 |
| Re-Fuel JP-8 (%) | 200 |
| Re-Fuel Auto-Diesel (%) | 100 |
| Re-Fuel Marine-Diesel (%) | 100 |
| Re-Fuel Gasoline (%) | 100 |

| Mission Costs | | |
|---|---|---|
| FBCF ($/gal) | $ | 10.68 |
| Total Cost | $ | 423,244.91 |
| Protection | $ | 251,593.77 |
|   Air | $ | 95,885.08 |
|   Ground | $ | 155,708.68 |
|   Sea | $ | - |
| Transport | $ | 41,136.07 |
|   Air | $ | - |
|   Ground | $ | 41,136.07 |
|   Sea | $ | - |
| Support | $ | 10,515.06 |
| Commodity | $ | 120,000.00 |
| Envir. Tax | $ | 4,000.00 |

[ Output... ]

| Estimated Casualties | |
|---|---|
| | 0.084 |

| Mission Fuel Consumption | |
|---|---|
| Marine Diesel Consumed | 0 ga |
| Auto Diesel Consumed | 1,507 ga |
| Gasoline Consumed | 0 ga |
| JP-8 Consumed | 3,150 ga |

| Asset Cost Components | |
|---|---|
| O&M | $ 269,818.88 |
| Crew Pay | $ 12,812.54 |
| Asset Util. | $ 11,421.20 |
| Fuel | $ 8,898.79 |
| Envir. Tax | $ 293.50 |

| Operation Hours | |
|---|---|
| Ground Protection Time | 7.5 hrs |
| Air Protection Time | 7.5 hrs |
| Ground Transport Time | 7.5 hrs |
| Air Transport Time | 0.0 hrs |

FROM FIG. 9A

Protection Presence

| Ground | 100% |
|---|---|
| Air | 100% |
| Sea | 0% |

912

Mission Phase List

Mission Phase: 1-Badram to ESC
Mission Phase: 2-ESC to FOB Orgun E
Mission Phase: 3-FOB Orgun E to BCT

902

[ Edit Phase ] [ Delete Phase ]

Return Trip? y
Add Phase [ Button-> ]

914

[ Clear Study ] [ Save Study ]   Ground_Delivery_Demo
[ Load a Saved Study ]   Ground_Delivery_Demo.xls ▼

FUEL DELIVERY COST ESTIMATION SYSTEM

BACKGROUND INFORMATION

1. Field

The present disclosure relates generally to fuel and, in particular, to fuel costs. Still more particularly, the present disclosure relates to a method and apparatus for estimating costs for moving fuel from one location to another location using vehicles.

2. Background

Fuel is used for operating vehicles, factories, plants, generators, and other platforms. As organizations increase their fuel consumption activities, the demand for fuel increases. This increased demand results in increasing costs for delivered fuel.

Military organizations are examples of one type of organization in which the demand for fuel has increased. This increased usage has resulted, in part, from using new versions of vehicles, such as fighter jets, tanks, ships, and other platforms, that consume more fuel than prior versions of these vehicles.

Further, increases in the costs for fuel are also associated with performing operations requiring fuel in locations that are distant from fuel sources. With the logistics and increased costs for moving fuel from one location to another location, such as from one country to another country, concern about the cost of fuel and, in particular, the cost of delivering fuel has also increased.

Further, concerns also are present with environmental issues that result from using fuel. For example, increased fuel usage results in increased greenhouse gas emissions. With the increasing global concern about these types of emissions, different organizations have looked at systems for reducing fuel usage.

With these environmental concerns and concerns about the increasing cost of fuel, many organizations are becoming interested in managing fuel costs.

Therefore, it would be advantageous to have a method and apparatus that takes into account some of the issues discussed above, as well as possibly other issues.

SUMMARY

In one advantageous embodiment, a method is provided for estimating a cost for moving fuel. A group of vehicles for moving the fuel from a starting location to a destination location is formed using user input. Operations for moving the fuel from the starting location to the destination location are identified using the user input. A set of additional vehicles for the group of vehicles is identified to form a current group of vehicles. Personnel for the current group of vehicles are identified. The cost for moving the fuel from the starting location to the destination location is identified using the current group of vehicles and the personnel.

In another advantageous embodiment, a method for identifying fuel costs for operating vehicles is provided. A group of vehicles for moving fuel from a starting location to a destination location is formed using user input. The group of vehicles is selected from a plurality of heterogeneous vehicles and includes a vehicle under consideration. Operations for moving the fuel from the starting location to the destination location are identified using the user input. A set of additional vehicles for the group of vehicles is identified to form a current group of vehicles. Personnel are identified for the current group of vehicles. A cost for moving the fuel from the starting location to the destination location is identified using the current group of vehicles and the personnel. The cost includes a cost for the vehicle under consideration. A determination is made as whether to use the vehicle under consideration based on the cost for the vehicle under consideration. In response to an absence of a determination to use the vehicle under consideration, at least one of changing a design for the vehicle under consideration and selecting a new vehicle for consideration is performed.

In yet another advantageous embodiment, a cost estimation system comprises a computer system and a fuel cost estimation module. The fuel cost estimation module is configured to run on the computer system and receive user input identifying a group of vehicles for moving fuel from a starting location to a destination location. The fuel cost estimation module is configured to identify operations for moving the fuel from the starting location to the destination location using the user input. The fuel cost estimation module is configured to identify a set of additional vehicles for the group of vehicles to form a current group of vehicles. The fuel cost estimation module is configured to identify personnel for the current group of vehicles and is configured to identify a cost for moving the fuel from the starting location to the destination location using the current group of vehicles and the personnel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood with reference to the following detailed description of an advantageous embodiment of the present disclosure when read in conjunction with the accompanying drawings, wherein:

FIG. 7 is an illustration of a new vehicle interface in accordance with an advantageous embodiment;

FIGS. 9A and 9B are illustrations of a mission building interface in accordance with an advantageous embodiment;

DETAILED DESCRIPTION

The different advantageous embodiments recognize and take into account a number of different considerations. For example, the different advantageous embodiments recognize and take into account that currently available systems for calculating the cost of delivering fuel, current systems do not always take into account as many factors as desired in the calculations. For example, currently available systems for calculating fuel costs do not take into account using vehicles for delivering fuel that travel in different environments such as in air, on land, on water, and/or in space.

Further, the different advantageous embodiments recognize and take into account that costs, such as, for example, costs for personnel to operate vehicles used to deliver the fuel, costs for personnel that perform maintenance on the vehicles, costs for the fuel consumed by the vehicles to deliver the fuel, and other costs may not be taken into account in calculating the cost of moving fuel from one location to another location.

Further, the different advantageous embodiments recognize and take into account that estimating fuel costs may involve a user identifying cost information for vehicles that move the fuel from different sources. This type of information identification may be more time consuming and difficult than desired.

Thus, the different advantageous embodiments provide a method and apparatus for estimating a cost for moving fuel. Further, the different advantageous embodiments also may provide a method and apparatus for selecting vehicles based on delivered fuel cost.

In one advantageous embodiment, a process estimates a cost for moving fuel. A group of vehicles for moving the fuel from a starting location to a destination location is formed from user input. Operations for moving the fuel from the starting location to the destination location are identified from the user input. A set of additional vehicles is identified for the group of vehicles to form a current group of vehicles. Personnel for the current group of vehicles also are identified. A cost for moving the fuel from the starting location to the destination location using the current group of vehicles and the personnel is identified.

Figure 1:
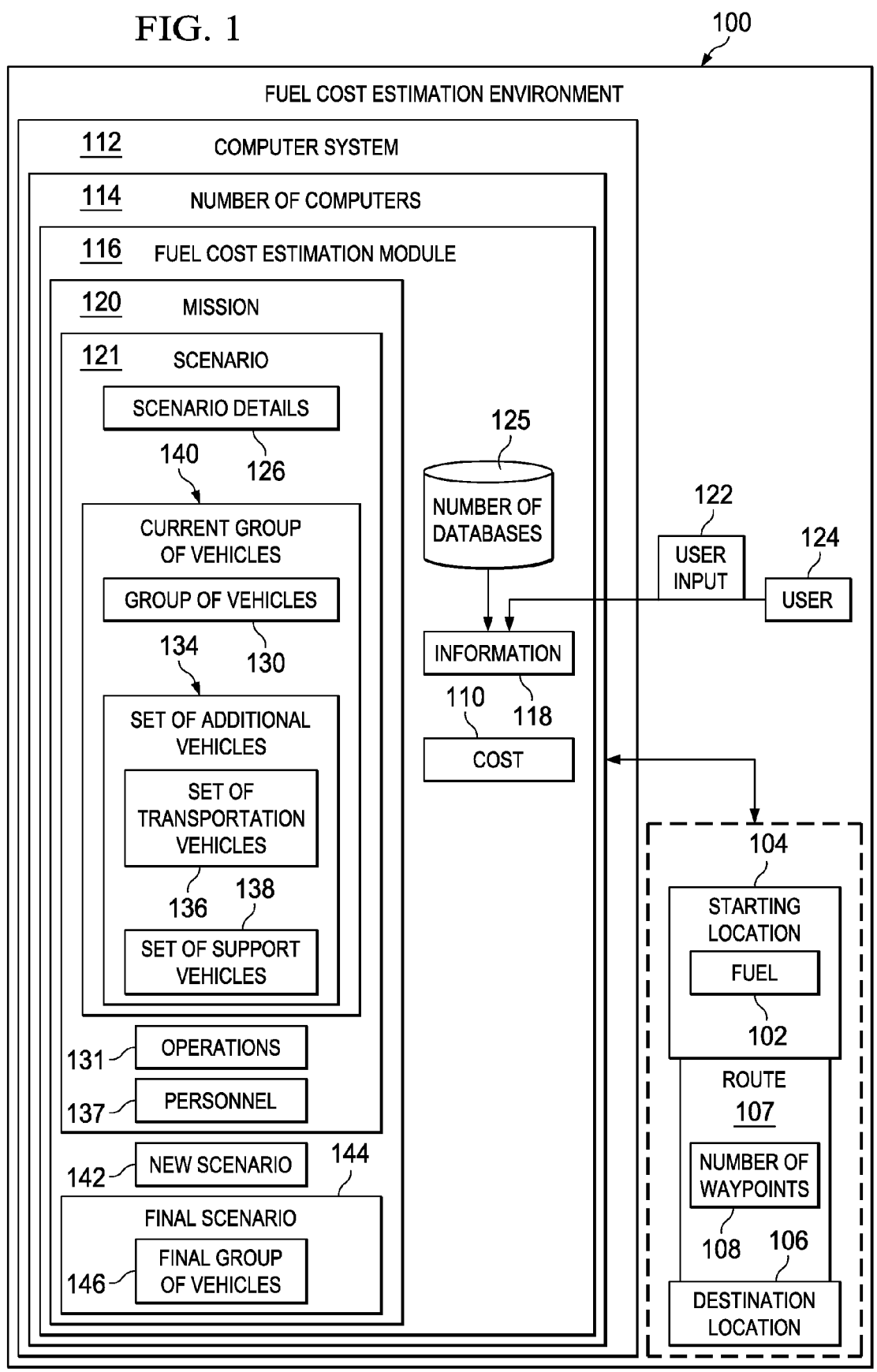
FIG. 1 is an illustration of a block diagram of a fuel cost estimation environment in accordance with an advantageous embodiment.

With reference now to FIG. 1, an illustration of a block diagram of a fuel cost estimation environment is depicted in accordance with an advantageous embodiment. In these illustrative examples, fuel cost estimation environment 100 is an environment in which fuel 102 may be moved from starting location 104 to destination location 106. Fuel 102 is moved from starting location 104 to destination location 106 along route 107. As depicted, number of waypoints 108 may be present along route 107 between starting location 104 and destination location 106.

Cost 110 is the total cost for moving fuel 102 from starting location 104 to destination location 106. Cost 110 may be referred to as a delivered fuel cost. In these illustrative examples, cost 110 is identified using computer system 112. Computer system 112 comprises number of computers 114. A "number", as used herein with reference to an item, means "one or more items". For example, "number of computers" means "one or more computers". In these illustrative examples, when more than one computer is present in computer system 112, these computers may be in communication with each other through communications links.

Number of computers 114 may be in locations selected from at least one of starting location 104, destination location 106, number of waypoints 108 between starting location 104 and destination location 106, and/or some other suitable location. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

As depicted, fuel cost estimation module 116 runs on computer system 112. In these illustrative examples, fuel cost estimation module 116 takes the form of software. In other illustrative examples, fuel cost estimation module 116 may take the form of hardware or a combination of hardware and software.

In these illustrative examples, fuel cost estimation module 116 identifies cost 110 for moving fuel 102 from starting location 104 to destination location 106 using information 118. For example, information 118 includes information about mission 120. Mission 120 is a goal in these illustrative examples. In particular, this goal is the delivery of fuel 102 from starting location 104 to destination location 106.

In these illustrative examples, mission 120 may be performed under a number of different scenarios. In other words, many different scenarios may be present for accomplishing the same goal of delivering fuel 102 from starting location 104 to destination location 106.

In these illustrative examples, scenario 121 is selected for mission 120. Scenario 121 comprises the details for how mission 120 is performed. For example, scenario 121 comprises the number of phases for mission 120, the particular vehicles used to perform mission 120, personnel for performing mission 120, operations performed during delivery of fuel 102, and/or other suitable factors involved in performing mission 120.

Fuel cost estimation module 116 identifies cost 110 for performing mission 120 for scenario 121 using information 118. Information 118 may be obtained through user input 122 provided by user 124, number of databases 125, and/or other sources of information 118. Of course, in some illustrative examples, user input 122 may be provided by more than one user.

In these illustrative examples, fuel cost estimation module 116 identifies cost 110 using user input 122 provided by user 124. Fuel cost estimation module 116 identifies scenario 121 for moving fuel 102 from starting location 104 to destination location 106 from user input 122.

For example, in these depicted examples, fuel cost estimation module 116 uses user input 122 to identify scenario details 126. Scenario details 126 include details about mission 120 for moving fuel 102 from starting location 104 to destination location 106. Scenario details 126 may include, for example, without limitation, an identification of starting location 104, an identification of destination location 106, a distance for a route between starting location 104 and destination location 106, a time of travel, an amount of fuel to be delivered, a number of phases for mission 120, and/or other relevant details about mission 120.

Additionally, fuel cost estimation module 116 identifies group of vehicles 130 for performing mission 120 using user input 122. A group of items, as used herein, is one or more items. In other words, group of vehicles 130 is one or more vehicles.

In these illustrative examples, fuel cost estimation module 116 may receive user input 122 in the form of a selection of group of vehicles 130 for mission 120. A vehicle in group of vehicles 130 may be selected from one of, for example, without limitation, a land vehicle, a water vehicle, an air vehicle, a space vehicle, and/or some other suitable type of vehicle. More specifically, a vehicle may be selected from one of, for example, an aircraft, an unmanned aerial vehicle, a tank, a tanker, a truck, a refueling aircraft, a ship, a submarine, or some other suitable type of vehicle.

Further, fuel cost estimation module 116 identifies operations 131 for performing mission 120. Operations 131 are the operations that are performed to complete mission 120. These operations also may be referred to as activities. In these examples, operations 131 are performed to deliver fuel 102 from starting location 104 to destination location 106. Operations 131 may be identified using user input 122.

In these illustrative examples, operations 131 may include, for example, without limitation, loading fuel 102 into one or more vehicles at starting location 104, traveling from starting location 104 to destination location 106, unloading fuel 102 at destination location 106, and/or other suitable types of operations. Operations 131 include purchasing fuel 102 and may include protecting fuel 102 as fuel 102 is moved from starting location 104 to destination location 106.

Operations 131 also may include operations performed while traveling along route 107 between starting location 104 to destination location 106. For example, operations 131 may include loading a portion of fuel 102 at one or more of number of waypoints 108 along route 107, refueling one or more vehicles which are moving fuel 102, traveling to number of waypoints 108, traveling from number of waypoints 108 to destination location 106, resting at number of waypoints 108, and/or other suitable operations.

In some illustrative examples, operations 131 may include introducing new vehicles into scenario 121 for mission 120 along route 107 and/or at one or more of number of waypoints 108 for performing mission 120. In some cases, operations 131 may include ending the use of certain vehicles in performing mission 120 along route 107 and/or at one or more of number of waypoints 108.

As depicted in these examples, fuel cost estimation module 116 identifies set of additional vehicles 134 for group of vehicles 130. In particular, fuel cost estimation module 116 may identify set of additional vehicles 134 based on operations 131 identified for mission 120. A set of items, as used herein, means zero, one, or more items. For example, set of additional vehicles 134 may be zero, one, two, or some other number of additional vehicles for use in delivering fuel 102. As a result, a set may be an empty or null set in some cases in the different illustrative embodiments.

For example, if group of vehicles 130 formed by fuel cost estimation module 116 using user input 122 is sufficient for performing mission 120, set of additional vehicles 134 may be an empty or null set and include no vehicles. If group of vehicles 130 formed by fuel cost estimation module 116 is not sufficient for performing mission 120, fuel cost estimation module 116 may identify one or more vehicles as set of additional vehicles 134 such that set of additional vehicles 134 and group of vehicles 130 can complete mission 120.

In some cases, fuel cost estimation module 116 may identify one or more vehicles as set of additional vehicles 134 when additional vehicles are not required but are desired for use in performing mission 120. For example, additional vehicles may be desired for tasks, such as transporting additional fuel, safety concerns, additional air and/or ground support, and/or other suitable tasks.

In these illustrative examples, set of additional vehicles 134 may include, for example, at least one of set of transportation vehicles 136, set of support vehicles 138, and other vehicles for use in performing mission 120. A support vehicle in set of support vehicles 138 may be selected from one of a protection vehicle, a fuel truck for carrying fuel 102, or some other suitable type of support vehicle.

In this manner, group of vehicles 130 and set of additional vehicles 134 form current group of vehicles 140. Current group of vehicles 140 forms the vehicles for use in performing mission 120 for scenario 121. Fuel cost estimation module 116 uses current group of vehicles 140 to identify cost 110 for scenario 121 for mission 120.

Further, fuel cost estimation module 116 identifies personnel 137 for performing operations 131. These operations 131 include operating current group of vehicles 140 in the depicted examples. For example, personnel 137 may include at least one of personnel to operate one or more vehicles in current group of vehicles 140, personnel to perform maintenance on one or more vehicles in current group of vehicles 140, personnel to load and/or unload fuel 102, and/or other suitable types of personnel.

In these illustrative examples, current group of vehicles 140, personnel 137, and operations 131 form scenario 121 for mission 120. Fuel cost estimation module 116 identifies cost 110 for performing mission 120 for scenario 121. In other words, cost 110 may be an estimation of the total cost for moving fuel 102 from starting location 104 to destination location 106 for scenario 121. This estimation is an approximation of what the actual cost is for moving fuel 102 from starting location 104 to destination location 106.

For example, cost 110 may be identified prior to performing mission 120, during mission 120, and/or after mission 120 has been performed. When cost 110 is identified prior to performing mission 120, cost 110 may be an approximation or a predicted cost for mission 120. This cost may be different from the actual cost for mission 120 once mission 120 has been completed.

In some illustrative examples, fuel cost estimation module 116 may analyze more than one scenario for mission 120 to move fuel 102. For example, a different scenario may include changes to at least one of current group of vehicles 140, personnel 137, operations 131, and other suitable factors. These changes may be based on user input 122 received from user 124.

For example, fuel cost estimation module 116 may receive user input 122 changing parameters, such as current group of vehicles 140, personnel 137, removing operations 131, and/or making other changes to mission 120. These changes to the parameters may involve removing and/or adding one or more of the items discussed above. In some cases, changes may be made to scenario details 126 for mission 120.

These different changes may form new scenario 142 for mission 120. Fuel cost estimation module 116 identifies cost 110 for performing mission 120 for new scenario 142 for mission 120.

In this manner, fuel cost estimation module 116 may identify costs for different scenarios for mission 120. Fuel cost estimation module 116 may identify final scenario 144 for mission 120 based on the costs identified for the different scenarios. Final scenario 144 includes final group of vehicles 146 for moving fuel 102 from starting location 104 to destination location 106. When scenario 121 is selected as final scenario 144, final group of vehicles 146 is current group of vehicles 140.

In some cases, fuel cost estimation module 116 may display the different costs for the different scenarios for mission 120 and allow user 124 to enter user input 122 selecting final scenario 144 and/or final group of vehicles 146 for moving fuel 102 from starting location 104 to destination location 106.

In this manner, fuel cost estimation module 116 identifies cost 110 for scenario 121 for performing mission 120 to move fuel 102 from starting location 104 to destination location 106. Fuel cost estimation module 116 provides a system for identifying cost 110 for mission 120 that takes less time and/or effort than identifying cost 110 with currently available systems.

Figure 2:
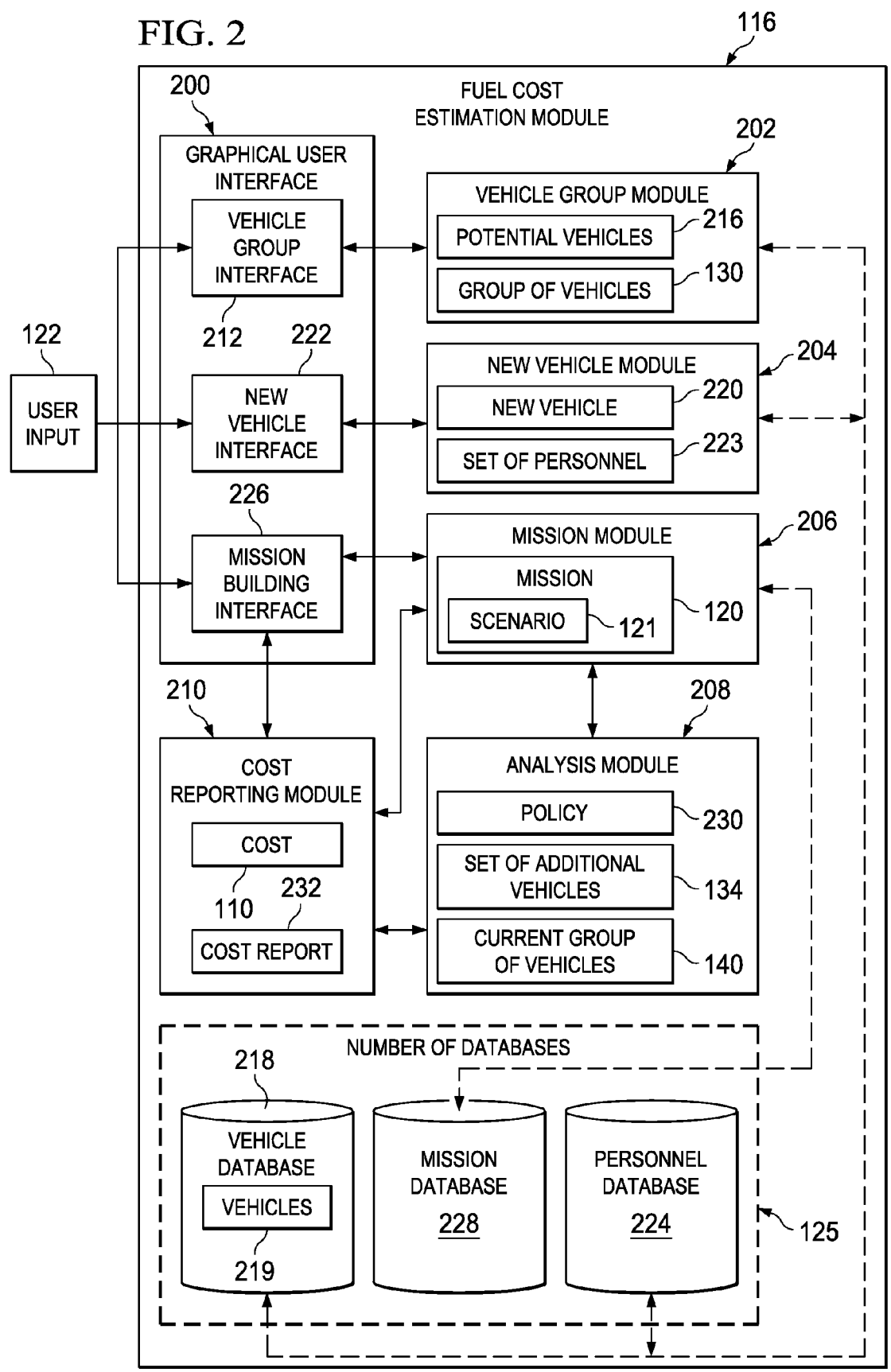
FIG. 2 is an illustration of a block diagram of a fuel cost estimation module in accordance with an advantageous embodiment.

With reference now to FIG. 2, an illustration of a block diagram of a fuel cost estimation module is depicted in accordance with an advantageous embodiment. Fuel cost estimation module 116 from FIG. 1 is shown in more detail in this figure. As illustrated, fuel cost estimation module 116 comprises graphical user interface 200, vehicle group module 202, new vehicle module 204, mission module 206, analysis module 208, cost reporting module 210, and number of databases 125.

Fuel cost estimation module 116 displays graphical user interface 200 to user 124 in FIG. 1. Graphical user interface 200 allows user 124 to enter user input 122. For example, graphical user interface 200 may display fields in which user input 122 may be entered. Vehicle group module 202, new vehicle module 204, mission module 206, analysis module 208, and/or cost reporting module 210 may be configured to receive user input 122 entered in these fields displayed on graphical user interface 200 and/or display information in graphical user interface 200.

For example, as depicted, vehicle group module 202 generates vehicle group interface 212 for display in graphical user interface 200. Vehicle group interface 212 receives user input 122 from user 124. User input 122 identifies vehicles for forming a group of vehicles, such as group of vehicles 130.

In one illustrative example, vehicle group module 202 identifies potential vehicles 216 using at least one of vehicle database 218 in number of databases 125 and user input 122. Potential vehicles 216 are vehicles that may be selected to form group of vehicles 130. In one illustrative example, potential vehicles 216 may be selected from vehicles 219 stored in vehicle database 218. For example, vehicle group module 202 may select one or more of vehicles 219 identified in vehicle database 218 as potential vehicles 216 for group of vehicles 130 based on user input 122. User input 122 may include, for example, a type of vehicle, a transportation mode, and/or other suitable information.

Vehicle group module 202 displays potential vehicles 216 to user 124 on vehicle group interface 212 in graphical user interface 200. Vehicle group module 202 forms group of vehicles 130 in response to receiving user input 122 selecting one or more of potential vehicles 216 for group of vehicles 130. User input 122 is received by vehicle group interface 212 in graphical user interface 200.

Vehicle group module 202 may store the selection of group of vehicles 130 in vehicle database 218 in number of databases 125. Of course, vehicle group module 202 may form other groups of vehicles from vehicles 219 stored in vehicle database 218. Further, in some illustrative examples, user input 122 may include information about group of vehicles 130 and/or one or more vehicles in group of vehicles 130. This information also may be processed by vehicle group module 202 and stored in vehicle database 218.

In these illustrative examples, new vehicle module 204 receives user input 122 identifying information about new vehicle 220. For example, new vehicle module 204 displays new vehicle interface 222 in graphical user interface 200. User 124 enters information about new vehicle 220 through new vehicle interface 222. This information may include, for example, without limitation, vehicle characteristics for new vehicle 220, a fuel burn rate, a cost of maintenance, a weight of new vehicle 200, and/or other suitable characteristics.

Further, user input 122 entered through new vehicle interface 222 also may include information about set of personnel 223 for new vehicle 220. This information may include, for example, a standard number of personnel needed to operate new vehicle 220, a cost for any personnel that is needed, and/or other suitable information. In one illustrative example, when new vehicle 220 is an unmanned ground vehicle, set of personnel 223 may be zero persons. When new vehicle 220 is a tanker, set of personnel 223 may be, for example, about five persons.

New vehicle interface 222 may be used to enter information about new vehicle designs. In this manner, new vehicle interface 222 may be used to identify the impact on the cost of moving fuel with different vehicle designs. The results based on using a new vehicle entered through new vehicle interface 222 may be used to make design changes to new vehicles. A new vehicle design, in these examples, may be for an entirely new vehicle or modifications to an existing vehicle.

New vehicle module 204 processes the information about new vehicle 220 received in user input 122 to form new vehicle 220. New vehicle module 204 may store new vehicle 220 as one of vehicles 219 in vehicle database 218 in number of databases 125. In this manner, depending on mission 120, new vehicle 220 may be considered as one of potential vehicles 216 for forming group of vehicles 130.

Additionally, new vehicle module 204 may store information about set of personnel 223 for new vehicle 220 in personnel database 224 in number of databases 125.

In these depicted examples, mission module 206 displays mission building interface 226 in graphical user interface 200. Mission module 206 receives and processes user input 122 entered through mission building interface 226.

User input 122 entered through mission building interface 226 may include, for example, scenario details 126 in FIG. 1, information about scenario 121, information about operations 131 in FIG. 1 for performing mission 120, a selection of a group of vehicles for performing mission 120, and/or other suitable types of information.

Mission module 206 processes user input 122 entered through mission building interface 226 to form mission 120 and scenario 121 for mission 120. Mission module 206 stores mission 120 and information about mission 120 and scenario 121 in mission database 228 in number of databases 125.

In these illustrative examples, analysis module 208 analyzes mission 120 and scenario 121 for mission 120 formed by mission module 206. For example, analysis module 208 determines whether the information for mission 120 and/or scenario 121 for mission 120 provided in user input 122 through mission building interface 226 meets policy 230. Policy 230 comprises a number of rules. The rules may be regulations, requirements, safety requirements, and/or other suitable criteria for performing mission 120.

Further, analysis module 208 determines whether group of vehicles 130 selected by user input 122 for mission 120 has the capabilities needed to perform mission 120. In other words, analysis module 208 identifies set of additional vehicles 134 for mission 120. Of course, in some cases, set of additional vehicles 134 may be zero vehicles. Analysis module 208 forms current group of vehicles 140 using group of vehicles 130 and set of additional vehicles 134. Analysis module 208 may be configured to display set of additional vehicles 134 on mission building interface 226 to user 124.

In these illustrative examples, cost reporting module 210 identifies cost 110 for performing mission 120. In particular, in these examples, cost reporting module 210 generates cost report 232. Cost report 232 may comprise any number of spreadsheets, databases, documents, charts, graphs, and/or other tools for displaying cost 110 and other suitable information to user 124. In these illustrative examples, cost reporting module 210 may display cost report 232 on mission building interface 226.

In this manner, fuel cost estimation module 116 allows cost 110 to be identified for delivering fuel 102 in FIG. 1 using various types of vehicles. This identification of cost 110 may be performed without requiring user 124 to gather information about the vehicles.

For example, this information may already be present in vehicle database 218. As a result, user 124 may be able to select group of vehicles 130 in mission building interface 226 without needing to enter information about group of vehicles 130.

Additionally, fuel cost estimation module 116 allows user 124 to make decisions about performing mission 120. For example, user 124 may make decisions about which vehicles may be selected for performing mission 120 to reduce cost 110. For example, user 124 may determine whether to purchase new vehicle 220 based on cost 110. Further, identifying cost 110 may help user 124 design new vehicle 220 for use. For example, user 124 may determine whether to change a design for new vehicle 220 based on cost 110.

Figure 3:
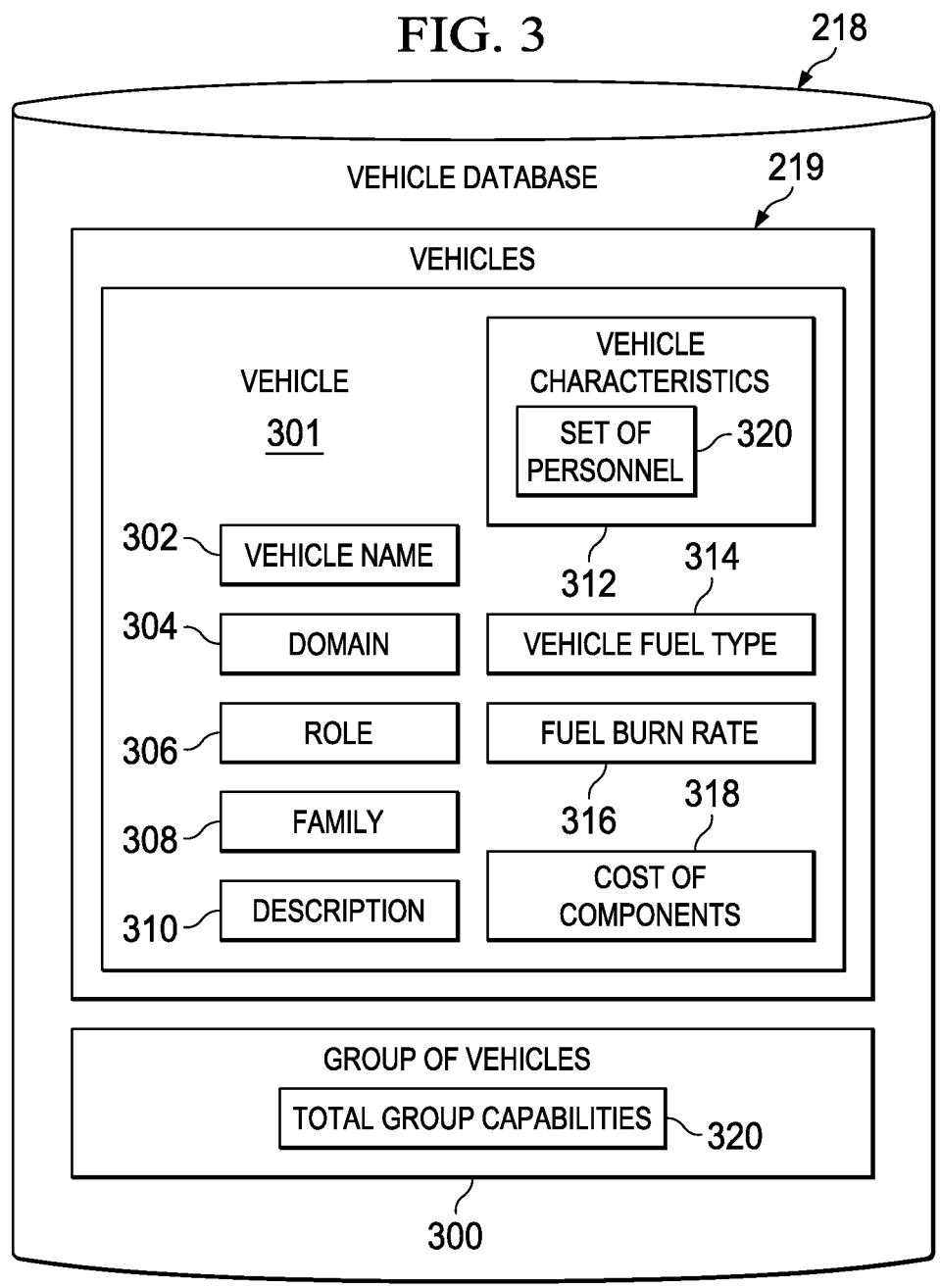
FIG. 3 is an illustration of a block diagram of a vehicle database in accordance with an advantageous embodiment.

With reference now to FIG. 3, an illustration of a block diagram of a vehicle database is depicted in accordance with an advantageous embodiment. In these illustrative examples, vehicle database 218 from FIG. 2 is depicted in more detail. As depicted, vehicle database 218 may include, for example, without limitation, information for vehicles 219 and group of vehicles 300.

Furthermore, vehicle 301 is an example of one vehicle in vehicles 219. Information about vehicle 301 stored in vehicle database 218 includes, for example, without limitation, vehicle name 302, domain 304, role 306, family 308, description 310, vehicle characteristics 312, vehicle fuel type 314, fuel burn rate 316, cost of components 318, and/or other suitable information.

Vehicle name 302 is a name for vehicle 301. Domain 304 indicates an environment in which vehicle 301 travels. For example, domain 304 may be on a surface of land, in air, under water, on a surface of water, in outerspace, a combination of one or more of these domains, and/or some other suitable type of domain. In an illustrative example, a vehicle that belongs to a land domain travels by land, while a vehicle that belongs to an air domain travels by air.

Vehicles 219 are a plurality of heterogeneous vehicles. Heterogeneous vehicles, in this illustrative example, comprise at least two vehicles that belong to at least two different domains. In some cases, a vehicle may belong to more than one domain.

In this illustrative example, role 306 is the part played by vehicle 301 within group of vehicles 300 in fulfilling the expected behavior and/or obligations of vehicle 301. Family 308 is a particular type or variant of vehicle 301. Different model numbers and/or makes may be present for each type of vehicle 301. Description 310 is a description for vehicle 301.

Vehicle characteristics 312 may include, for example, without limitation, an empty weight for vehicle 301, a gross weight for vehicle 301 with fuel 102 in FIG. 1 in vehicle 301, a cruise speed, a range, a storage capacity, a fuel tank size, engine efficiency, and/or other suitable information. In some cases, vehicle characteristics 312 also may include set of personnel 320. Set of personnel 320 is the number of persons or crew members needed to operate vehicle 301.

Vehicle fuel type 314 is the type of fuel consumed by vehicle 301 during operation of vehicle 301. Fuel burn rate 316 is the rate at which fuel 102 is consumed by vehicle 301 during operation of vehicle 301. Fuel burn rate 316 may be in gallons per hour, for example. Cost of components 318 may include, for example, a cost for operation and maintenance, a cost for set of personnel 320, and/or other suitable costs associated with vehicle 301.

In this illustrative example, group of vehicles 300 includes groups of vehicles that have been formed by vehicle group module 202 in FIG. 2. Group of vehicles 300 may include various groupings of vehicles 219. Group of vehicles 130 is an example of one of group of vehicles 300. Vehicle database 218 may include a link between group of vehicles 130 and the information stored in vehicle database 218 for each vehicle of vehicles 219 in group of vehicles 300.

Further, vehicle database 218 also may include information about total group capabilities 322 for group of vehicles 300. Total group capabilities 322 are the combined capabilities of all of the vehicles in group of vehicles 300. Total group capabilities 322 may include, for example, a total range, a cruise speed, a total fuel storage capacity, and/or other suitable information.

In these illustrative examples, total group capabilities 322 may be calculated as needed based on values retrieved from vehicle database 218. For example, a total fuel storage capacity for a group of vehicles is a sum of the fuel storage capacities for all of the vehicles in the group. A cruise speed for the group of vehicles is typically the slowest cruise speed for the group. Similarly, a total range also may be the smallest range for the group of vehicles.

Figure 4:
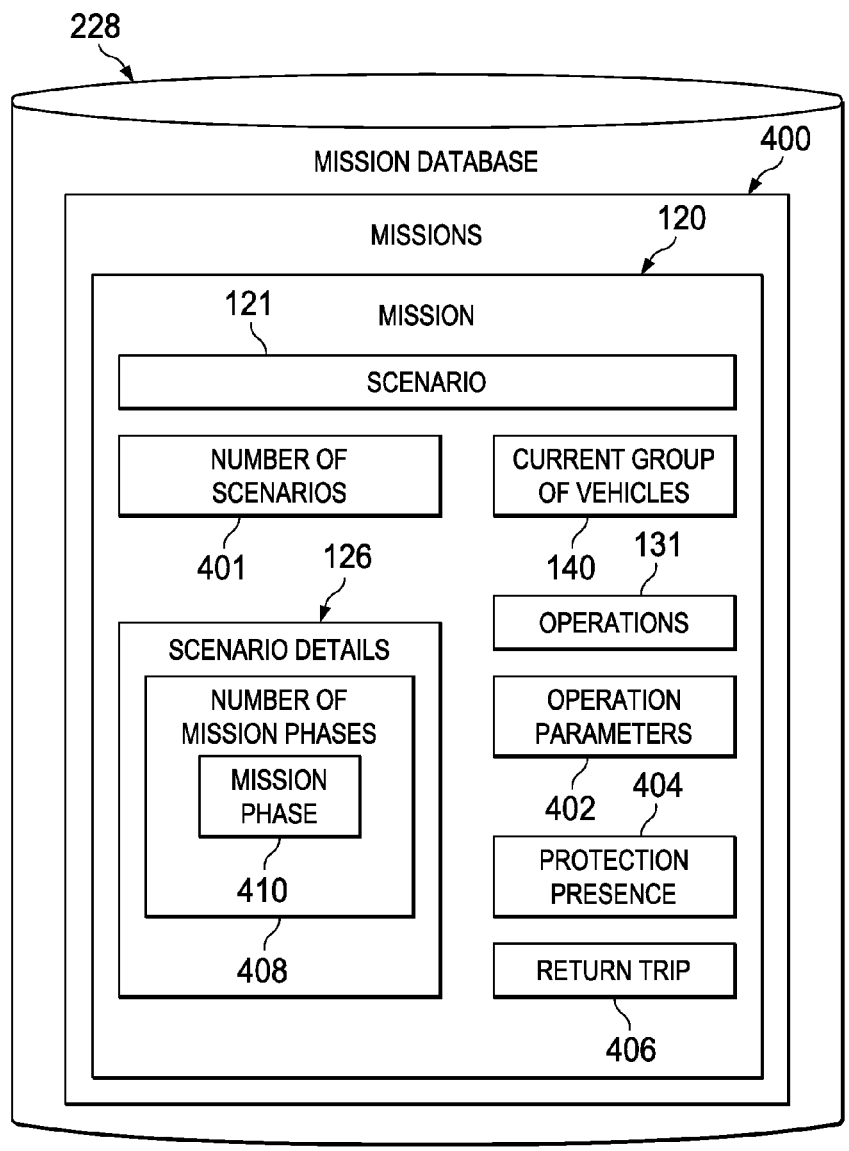
FIG. 4 is an illustration of a block diagram of a mission database in accordance with an advantageous embodiment.

With reference now to FIG. 4, an illustration of a block diagram of a mission database is depicted in accordance with an advantageous embodiment. In this illustrative example, mission database 228 from FIG. 2 is depicted in accordance with an advantageous embodiment. As depicted, mission database 228 stores information about missions 400. In these illustrative examples, a mission in missions 400 may be retrieved from mission database 228 for editing, modifications, and/or comparison to other missions in mission database 228.

A mission in missions 400 may be, for example, the delivery of fuel by land from one location to another location. Another mission may be the delivery of fuel by air from one country to another country. A number of scenarios may be possible for accomplishing these different types of missions.

For example, mission 120 is an example of one of missions 400. Number of scenarios 401 is present for performing mission 120. Scenario 121 is an example of one of number of scenarios 401. Information stored in mission database 228 for scenario 121 for mission 120 may include, for example, without limitation, scenario details 126, current group of vehicles 140, operations 131, operation parameters 402, protection presence 404, return trip 406, and/or other suitable types of information.

Scenario details 126 may include, for example, without limitation, number of mission phases 408. Number of mission phases 408 is a number of phases of delivery for delivering fuel 102 from starting location 104 to destination location 106. Mission phase 410 is an example of one of number of mission phases 408. Mission phase 410 is for a particular portion of mission 120. For example, mission phase 410 may be for a particular duration of travel along route 107 between starting location 104 and destination location 106 in FIG. 1. In some cases, mission phase 410 may be the portion of mission 120 that occurs between two waypoints within number of waypoints 108 along route 107.

Current group of vehicles 140 is the group of vehicles that has been selected for performing mission 120. In some illustrative examples, each mission phase in number of mission phases 408 may be associated with a different current group of vehicles. In this manner, multiple groups of vehicles may be selected for performing mission 120.

Mission database 228 stores operations 131. Further, mission database 228 stores operation parameters 402 for operations 131. Operation parameters 402 may include parameters for performing operations 131. In one illustrative example, an operation in operations 131 may be loading fuel 102 into a tanker at starting location 104. Operation parameters 402 may include a value for the amount of fuel to be loaded into a tanker. In some cases, the amount of fuel loaded into the tanker may be greater than the amount of fuel unloaded at destination location 106.

In this illustrative example, protection presence 404 indicates a percentage of time during which protection vehicles may be needed during each mission phase in number of mission phases 408. These protection vehicles are tasked with protecting fuel 102 and the vehicles moving fuel 102 to destination location 106. Further, these protection vehicles are an example of vehicles in set of support vehicles 138.

Return trip 406 is an indication of whether mission 120 includes a return trip for the vehicles performing mission 120 from destination location 106 back to starting location 104. When mission 120 includes a return trip, the time of travel is increased for the vehicles performing mission 120 as is the amount of fuel consumed.

Figure 5:
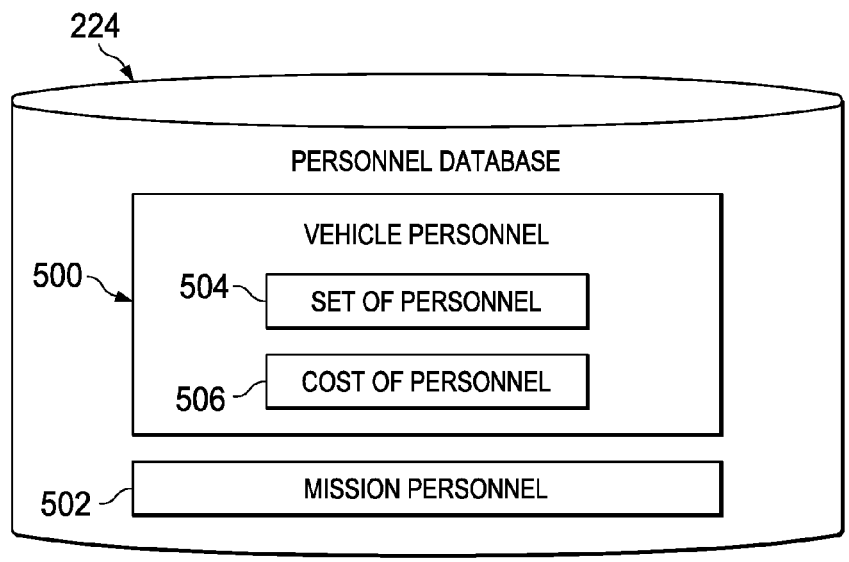
FIG. 5 is an illustration of a block diagram of a personnel database in accordance with an advantageous embodiment.

With reference now to FIG. 5, an illustration of a block diagram of a personnel database is depicted in accordance with an advantageous embodiment. In this illustrative example, personnel database 224 from FIG. 2 is depicted in more detail. As illustrated, personnel database 224 stores information about personnel for each vehicle in vehicles 219 in vehicle database 218 in FIG. 2. Further, personnel database 224 also stores information about personnel for performing each mission in missions 400 in FIG. 4.

For example, personnel database 224 includes vehicle personnel 500, mission personnel 502, and/or other suitable types of personnel. Vehicle personnel 500 includes information about the number of persons needed to operate a particular type of vehicle. For example, for vehicle 301 in vehicle database 218 in FIG. 3, vehicle personnel 500 includes set of personnel 504 and cost of personnel 506. Set of personnel 504 is the standard number of persons needed for operating vehicle 301 and/or performing maintenance on vehicle 301 during mission 120 in FIG. 1. Cost of personnel 506 is the cost or pay for set of personnel 504.

Mission personnel 502 includes an indication of all persons needed for performing a particular mission. Mission personnel 502 may include persons in addition to the persons needed to operate vehicles and/or perform maintenance. For example, mission personnel 502 may include a number and cost for persons needed to monitor the safety of fuel 102, operate fuel pumping and storage facilities, and/or operate and maintain vehicles performing mission 120 in FIG. 1.

Figure 6:
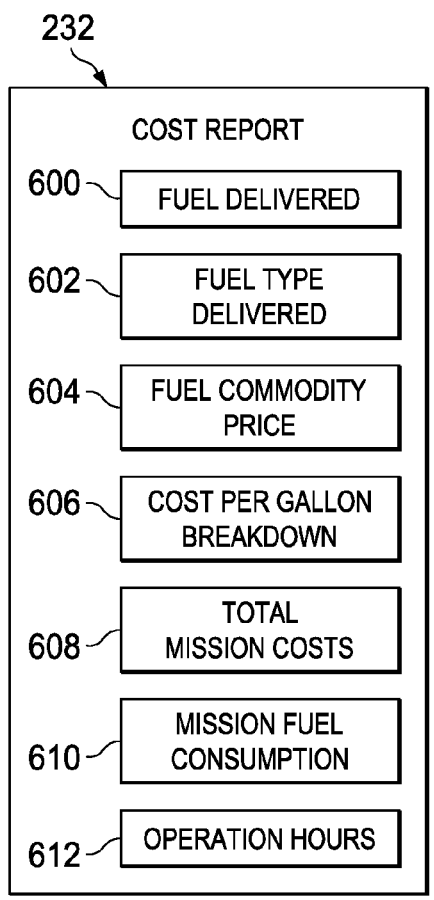
FIG. 6 is an illustration of a block diagram of a cost report in accordance with an advantageous embodiment.

With reference now to FIG. 6, an illustration of a block diagram of a cost report is depicted in accordance with an advantageous embodiment. In this illustrative example, cost report 232 from FIG. 2 is depicted in more detail. As illustrated, cost report 232 may include fuel delivered 600, fuel type delivered 602, fuel commodity price 604, cost per gallon breakdown 606, total mission costs 608, mission fuel consumption 610, operation hours 612, and/or other suitable types of information.

Fuel delivered 600 indicates an amount of fuel 102 delivered to destination location 106 in FIG. 1. Fuel type delivered 602 indicates the type of fuel 102 delivered to destination location 106. Fuel commodity price 604 indicates the price for the particular type of fuel 102.

In this illustrative example, cost per gallon breakdown 606 may be the cost per gallon for delivering fuel 102 to destination location 106. These costs may be broken down by operation, phase, vehicle, and/or some other metric.

Total mission costs 608 include the various costs for performing mission 120 in FIG. 1. Mission fuel consumption 610 is the amount of fuel consumed by the vehicles performing mission 120. Operation hours 612 are the amount of time required for performing mission 120 and/or the various phases of mission 120.

The illustrations of fuel cost estimation environment 100 in FIG. 1, fuel cost estimation module 116 in FIG. 2, vehicle database 218 in FIG. 3, mission database 228 in FIG. 4, personnel database 224 in FIG. 5, and cost report 232 in FIG. 6 are not meant to imply limitations to the manner in which the different advantageous embodiments may be implemented.

Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, mission 120 may be for delivering fuel 102 from starting location 104 to destination location 106 using a pipeline and/or fuel storage units instead of vehicles, such as group of vehicles 130. As one illustrative example, scenario 121 for mission 120 to deliver fuel 102 using a pipeline may comprise details, such as a rate of fuel transfer through the pipeline, a number of storage units, a storage capacity at destination location 106, and/or other suitable information.

In other illustrative examples, additional databases may be present in fuel cost estimation module 116 in addition to vehicle database 218, mission database 228, and personnel database 224 in FIG. 2. In some cases, number of databases 125 in fuel cost estimation module 116 may be one database of information forming a repository.

In still other illustrative examples, vehicle group interface 212, new vehicle interface 222, and mission building interface 226 may be part of the same interface in graphical user interface 200. For example, these interfaces may be displayed as three different spreadsheets displayed on the same graphical user interface 200 at the same time. Of course, these interfaces may be displayed in any of a number of different ways.

With reference now to FIG. 7, an illustration of a new vehicle interface is depicted in accordance with an advantageous embodiment. In this illustrative example, an example of one implementation for new vehicle interface 222 from FIG. 2 is depicted. In this illustrative example, new vehicle interface 222 displays information that may be retrieved from vehicle database 218 and/or allows user 124 from FIG. 1 to enter information into vehicle database 218.

In this illustrative example, user 124 may enter user input 122 in new vehicle interface 222 to form a new vehicle in vehicles 219 in vehicle database 218 in FIG. 2. Further, user input 122 may be entered to change an existing vehicle or add a new vehicle in vehicles 219 in vehicle database 218, such as vehicle 301 in FIG. 3.

As illustrated, new vehicle interface 222 displays vehicle name 700, domain 702, role 704, family 706, description 708, vehicle characteristics 710, fuel burn rate 712, vehicle fuel type 714, cost of components 716, vehicle list 718, and database list 720.

Vehicle name 700 is a field that corresponds to vehicle name 302 in vehicle database 218. Domain 702 is a field for domain 304 in vehicle database 218. Role 704 is a field that corresponds to role 306 in vehicle database 218. Family 706 is a number of fields for family 308 in vehicle database 218. Description 708 is a field that corresponds to description 310 in vehicle database 218.

Further, vehicle characteristics 710 include fields that correspond to vehicle characteristics 312 in vehicle database 218. Fuel burn rate 712 and vehicle fuel type 714 are fields for fuel burn rate 316 and vehicle fuel type 314, respectively, in vehicle database 218. Cost of components 716 includes fields that correspond to cost of components 318 in vehicle database 218.

Additionally, vehicle list 718 includes a list of vehicles that have been created and/or edited by user 124 in FIG. 1. Database list 720 includes a list of all vehicles in vehicles 219 in vehicle database 218. A vehicle identified in vehicle list 718 may not be used in performing a mission, such as mission 120 in FIG. 1, until the vehicle has been added to vehicle database 218.

Figure 8:
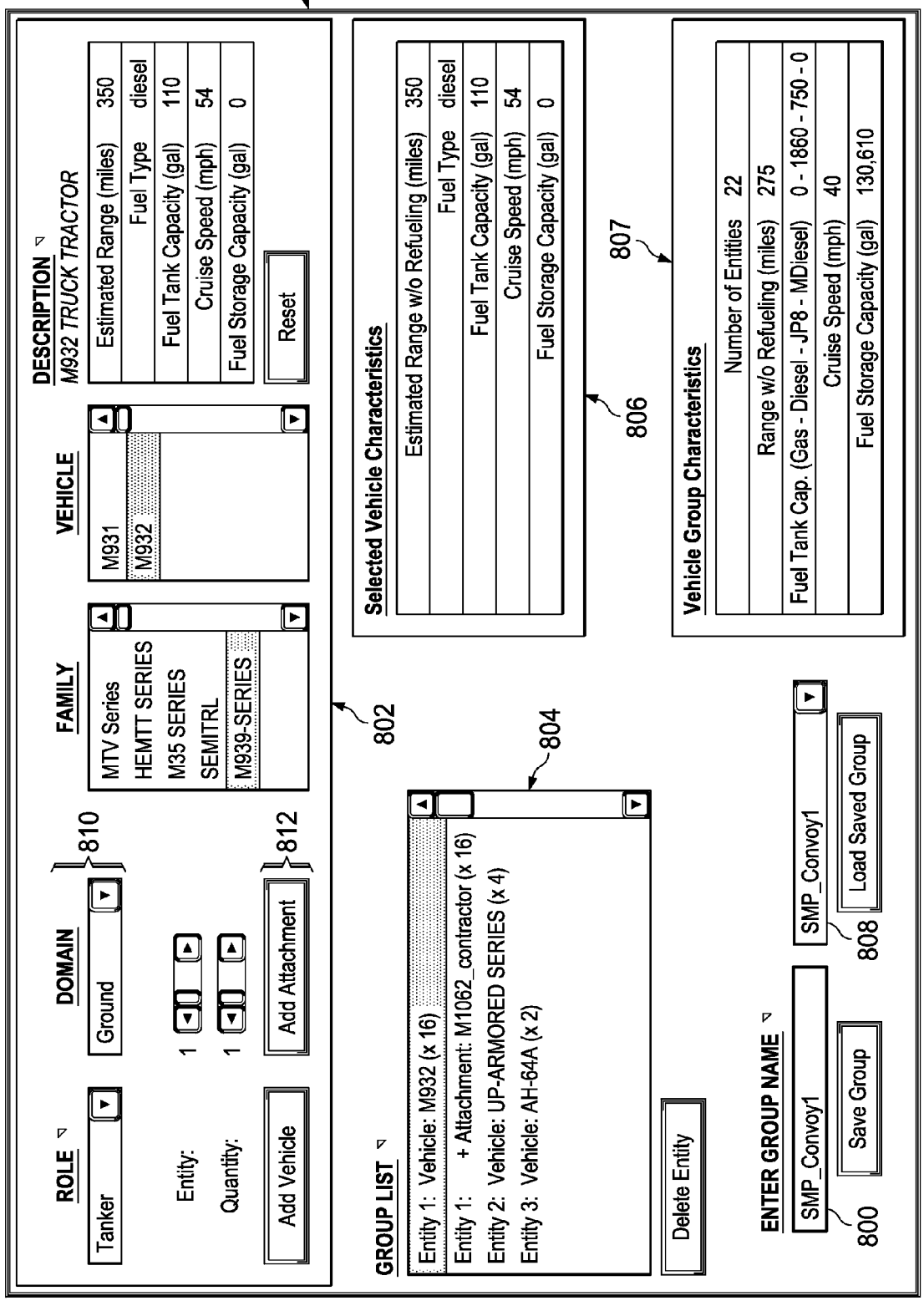
FIG. 8 is an illustration of a vehicle group interface in accordance with an advantageous embodiment.

With reference now to FIG. 8, an illustration of a vehicle group interface is depicted in accordance with an advantageous embodiment. In this illustrative example, an example of one implementation for vehicle group interface 212 from FIG. 2 is depicted. Vehicle group interface 212 displays information that may be retrieved from vehicle database 218 and/or allows user 124 from FIG. 1 to enter information into vehicle database 218.

As depicted, vehicle group interface 212 displays group name 800, vehicle group formation section 802, group list 804, vehicle characteristics 806, group characteristics 807, and group selection 808. Group name 800 is a field allowing user 124 to enter a name for a new group being formed. Vehicle group formation section 802 includes menus 810 and buttons 812 that allow user 124 to select one or more vehicles from potential vehicles 216 to add to group of vehicles 130.

In this illustrative example, group list 804 is a list of the vehicles in a group of vehicles. Vehicle characteristics 806 are the characteristics for a vehicle selected in group list 804. These characteristics may be retrieved from, for example, vehicle characteristics 312 in vehicle database 218 in FIG. 3. Group characteristics 807 are characteristics that have been identified for the group of vehicles. These characteristics may be retrieved from, for example, total group capabilities 322 in vehicle database 218.

Additionally, group selection 808 is a menu that allows user 124 to select a group of vehicles in groups of vehicles 300 in vehicle database 218 for editing.

With reference now to FIGS. 9A and 9B, an illustration of a mission building interface is depicted in accordance with an advantageous embodiment. In this illustrative example, an example of one implementation for mission building interface 226 from FIG. 2 is depicted. Mission building interface 226 may display information retrieved from and/or allow user 124 from FIG. 1 to enter information into at least one of vehicle database 218, mission database 228, and personnel database 224.

As illustrated, mission building interface 226 displays scenario details 900, mission phase list 902, group selection 904, group characteristics 906, consumption chart 908, activities 910, protection presence 912, return trip 914, and cost report 916.

In this illustrative example, scenario details 900 are fields that correspond to scenario details 126 from FIG. 1 in mission database 228 in FIG. 2. Mission phase list 902 is a list of the different mission phases that have been identified for a particular mission.

Group selection 904 is a menu that allows a selection of a group of vehicles from groups of vehicles 300 in vehicle database 218 in FIG. 3 for performing the mission. Group characteristics 906 are characteristics that have been identified for the group of vehicles. These characteristics may be retrieved from, for example, total group capabilities 322 in vehicle database 218.

Consumption chart 908 provides the amount of fuel that is consumed or used for the particular mission phase selected from mission phase list 902. Activities 910 are operation parameters 402 for operations 131 in mission database 228 in FIG. 4. Protection presence 912 includes fields for protection presence 404 in mission database 228. Return trip 914 includes fields corresponding to return trip 406 in mission database 228.

In this illustrative example, cost report 916 is an example of one implementation for cost report 232 in FIG. 2. For example, cost report 916 includes information that corresponds to fuel delivered 600, fuel type delivered 602, fuel commodity price 604, cost per gallon breakdown 606, total mission costs 608, mission fuel consumption 610, and operation hours 612 in FIG. 6 and/or other suitable types of information.

Figure 10:
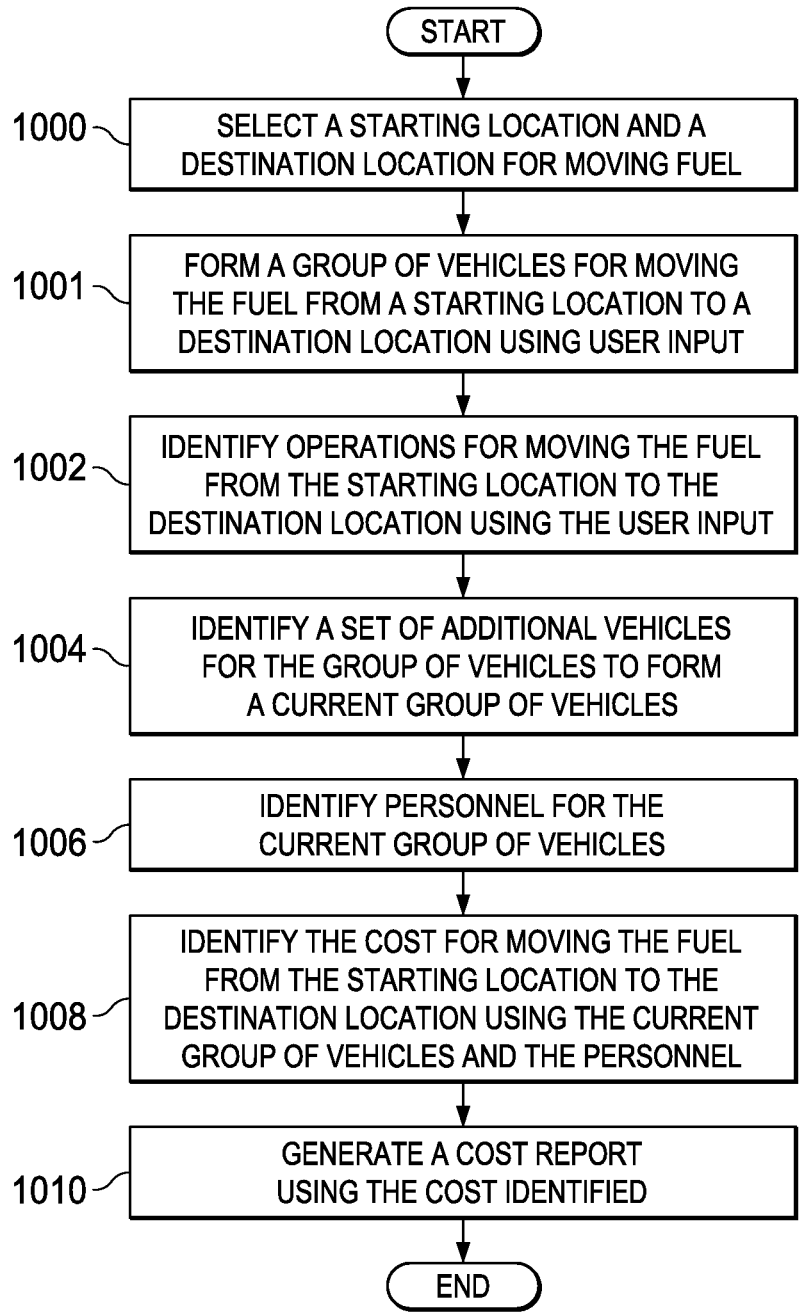
FIG. 10 is an illustration of a flowchart of a process for estimating a cost for moving fuel in accordance with an advantageous embodiment.

With reference now to FIG. 10, an illustration of a flowchart of a process for estimating a cost for moving fuel is depicted in accordance with an advantageous embodiment. The process illustrated in FIG. 10 may be performed by fuel cost estimation module 116 in FIGS. 1 and 2.

The process begins by selecting a starting location and a destination location for moving fuel (operation 1000). The fuel is to be moved from the starting location to the destination location. The process then forms a group of vehicles for moving the fuel from a starting location to a destination location using user input (operation 1001). For example, user input may be received identifying or selecting a group of vehicles for moving the fuel.

The process then identifies operations for moving the fuel from the starting location to the destination location using the user input (operation 1002). These operations also may be referred to as activities.

Thereafter, the process identifies a set of additional vehicles for the group of vehicles to form a current group of vehicles (operation 1004). This set of additional vehicles may include one or more additional vehicles or may be a null or empty set. For example, if the group of vehicles formed using the user input is sufficient for moving the fuel to the destination location, the set of additional vehicles identified may be a null set.

Next, the process identifies personnel for the current group of vehicles (operation 1006). Personnel may include personnel to operate the current group of vehicles and/or perform maintenance for the current group of vehicles. The process then identifies the cost for moving the fuel from the starting location to the destination location using the current group of vehicles and the personnel (operation 1008). The process then generates a cost report using the cost identified (operation 1010), with the process terminating thereafter.

In this illustrative example, the cost report may be used to select vehicles for moving from a starting location to destination location. In some cases, a user may make a decision to change a design of a vehicle in the current group of vehicles based on the cost identified in the cost report. In this manner, the contribution of an individual vehicle in the current group of vehicles to the cost for moving the fuel from the starting location to the destination location may be used.

Figure 11:
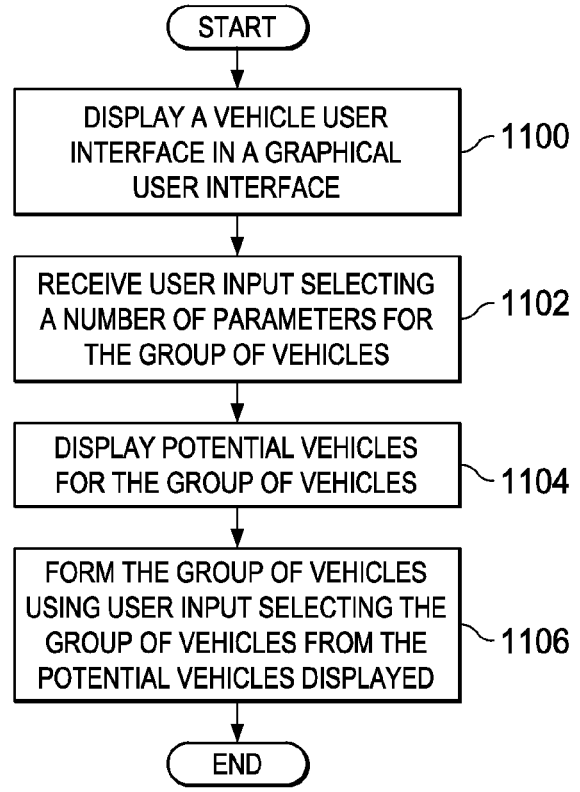
FIG. 11 is an illustration of a flowchart of a process for forming a current group of vehicles using user input in accordance with an advantageous embodiment.

With reference now to FIG. 11, an illustration of a flowchart of a process for forming a current group of vehicles using user input is depicted in accordance with an advantageous embodiment. The process illustrated in FIG. 11 may be implemented to perform operation 1002 in FIG. 10.

The process begins by displaying a vehicle user interface in a graphical user interface (operation 1100). For example, in operation 1100, vehicle group interface 212 may be displayed in graphical user interface 200 from FIG. 2. The process then receives user input selecting a number of parameters for the group of vehicles (operation 1102). These parameters may include, for example, without limitation, a domain, a role, a family, and/or a description for a vehicle. The process displays potential vehicles for the group of vehicles (operation 1104).

Next, the process forms the group of vehicles using user input selecting the group of vehicles from the potential vehicles displayed (operation 1106), with the process terminating thereafter.

Figure 12:
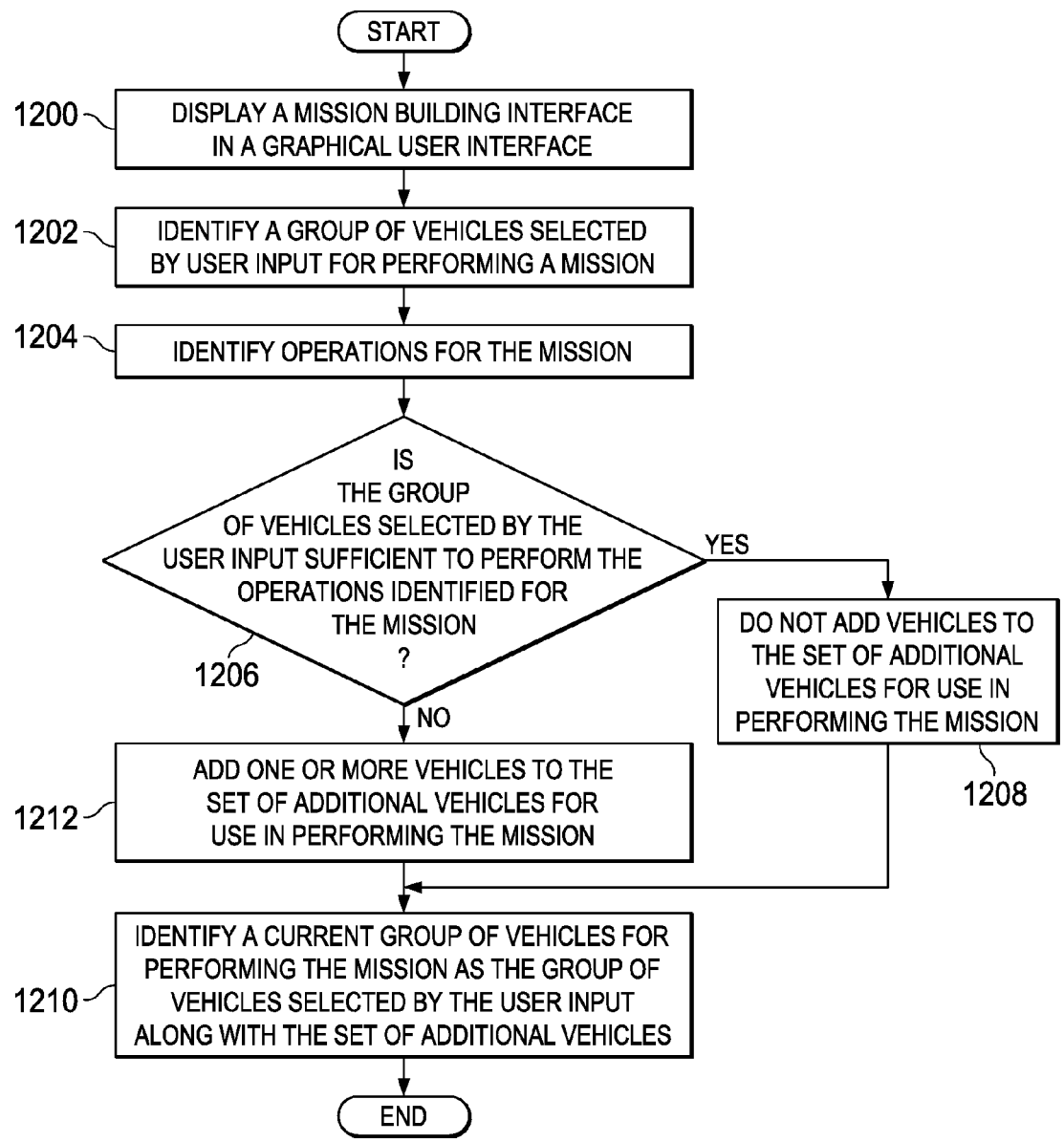
FIG. 12 is an illustration of a flowchart of a process for forming a current group of vehicles in accordance with an advantageous embodiment.

With reference now to FIG. 12, an illustration of a flowchart of a process for forming a current group of vehicles is depicted in accordance with an advantageous embodiment. The process illustrated in FIG. 12 may be performed by fuel cost estimation module 116 in FIGS. 1 and 2.

The process begins by displaying a mission building interface in a graphical user interface (operation 1200). For example, in operation 1200, mission building interface 226 may be displayed in graphical user interface 200 in FIG. 2. The process then identifies a group of vehicles selected by user input for performing a mission (operation 1202). The mission is for delivering fuel from a starting location to a destination location. The process then identifies operations for the mission (operation 1204). These operations may be activities that are performed to complete the mission.

Next, the process determines whether the group of vehicles selected by the user input is sufficient to perform the operations identified for the mission (operation 1206). If the group of vehicles is sufficient, vehicles are not added to the set of additional vehicles for use in performing the mission (operation 1208). The set of vehicles is initialized as an empty set of vehicles and remains an empty set of vehicles if vehicles are not added. Thereafter, the process identifies a current group of vehicles for performing the mission as the group of vehicles selected by the user input along with the set of additional vehicles (operation 1210), with the process terminating thereafter.

Referring again to operation 1206, if the group of vehicles is not sufficient, the process adds one or more vehicles to the set of additional vehicles for use in performing the mission (operation 1212). The set of additional vehicles identified in operation 1212 may include, for example, a set of transportation vehicles, a set of support vehicles, and/or other types of vehicles. The process then continues to operation 1210 as described above.

Figure 13:
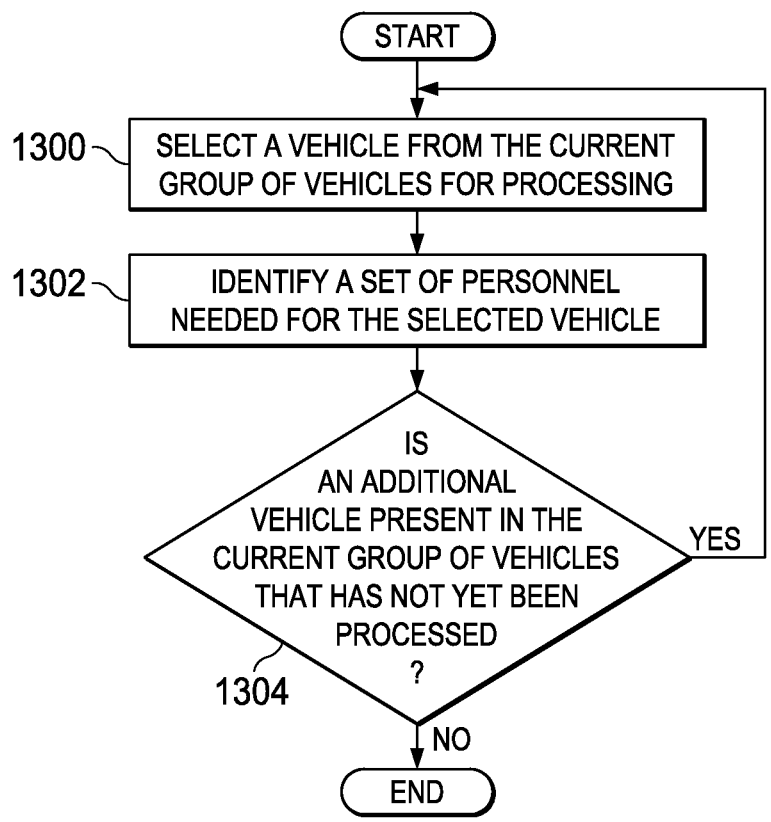
FIG. 13 is an illustration of a flowchart of a process for identifying personnel in accordance with an advantageous embodiment.

With reference now to FIG. 13, an illustration of a flowchart of a process for identifying personnel is depicted in accordance with an advantageous embodiment. The process illustrated in FIG. 13 is an example of an implementation for operation 1006 in FIG. 10.

The process begins by selecting a vehicle from the current group of vehicles for processing (operation 1300).

The process then identifies a set of personnel needed for the selected vehicle (operation 1302). This operation may be performed by accessing a personnel database, such as personnel database 224 in FIG. 2. In operation 1302, the process identifies the set of personnel for the selected vehicle and the cost for the set of personnel as part of identifying the personnel for the vehicle.

The process then determines whether an additional vehicle is present in the current group of vehicles that has not yet been processed (operation 1304). If an additional vehicle is present, the process returns to operation 1300. Otherwise, the process terminates.

The different operations performed in FIG. 13 identify personnel on a per-vehicle basis in addition to identifying the total number of personnel needed for the group of vehicles and the set of additional vehicles.

Figure 14:
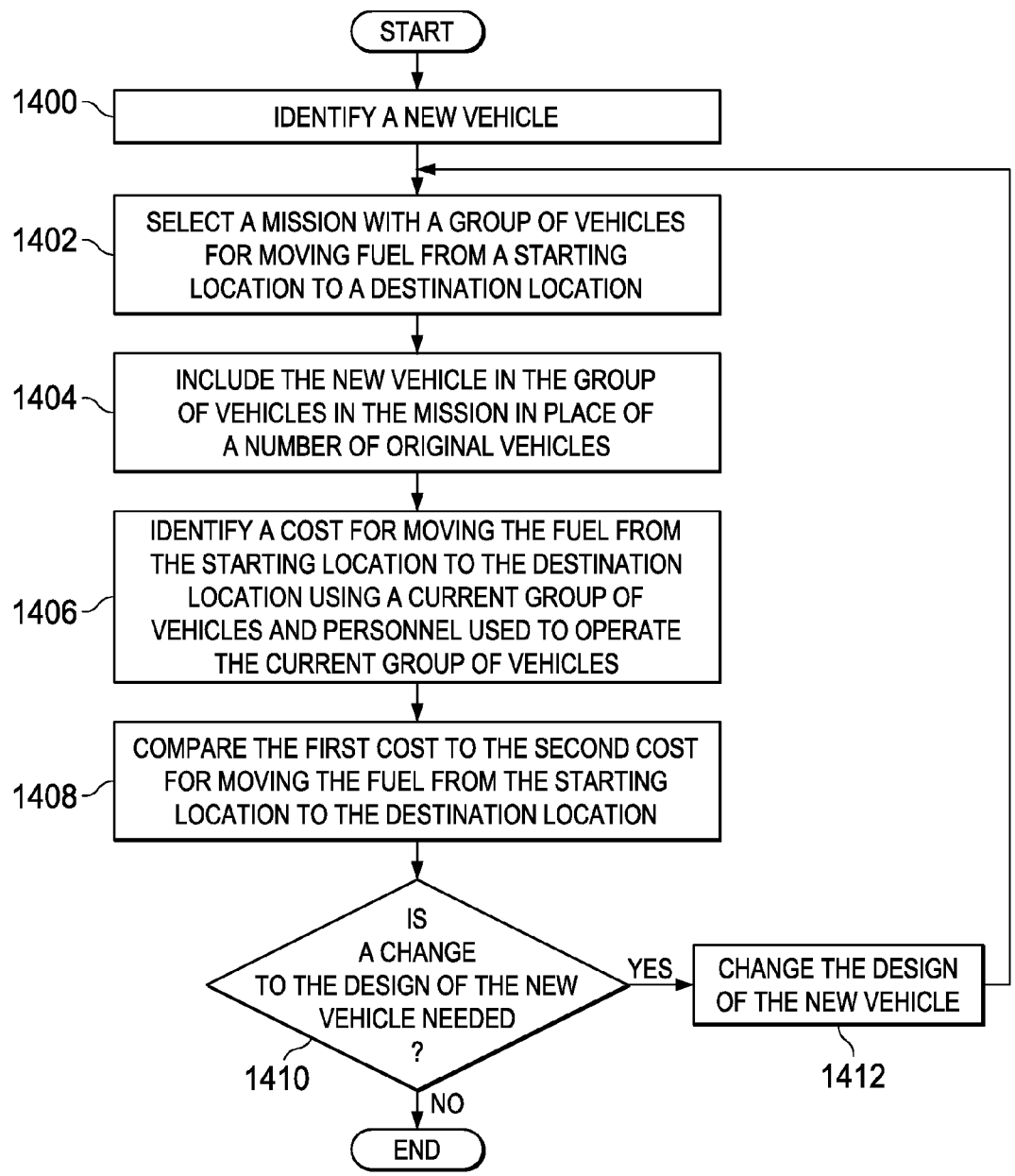
FIG. 14 is an illustration of a flowchart of a process for designing a new vehicle in accordance with an advantageous embodiment.

With reference now to FIG. 14, an illustration of a flowchart of a process for designing a new vehicle is depicted in accordance with an advantageous embodiment. The process in FIG. 14 may be implemented using fuel cost estimation module 116 in FIG. 2. Fuel cost estimation module 116 may be used to identify costs for new vehicles to determine whether changes in the design of the new vehicles are desired.

The process begins by identifying a new vehicle (operation 1400). The identification of the new vehicle may be, for example, a selection of a model or design for the new vehicle. This identification also may be performed by user input entering information about the new vehicle. In these examples, the information may be entered through new vehicle interface 222 in fuel cost estimation module 116 in FIG. 2.

Further, the new vehicle identified in operation 1400 may be an entirely new design for a vehicle that does not currently exist. In some illustrative examples, the new vehicle identified in operation 1400 may be a current vehicle with modifications or changes. In this manner, designs for new vehicles or proposed changes for new vehicles may be entered for use in identifying the impact of those vehicles in the cost of moving fuel.

A mission is selected with a group of vehicles for moving fuel from a starting location to a destination location (operation 1402). This mission may be selected in a number of different ways. For example, the mission may be a pre-existing mission that had been performed or previously defined.

In other illustrative examples, the selection of the mission may be performed by entering information about the mission. This information may include, for example, without limitation, user input identifying operations for moving the fuel from a starting location to a destination location. The process also may identify the group of vehicles if the mission has not been previously defined.

The process then includes the new vehicle in the group of vehicles in the mission in place of a number of original vehicles (operation 1404). This operation forms a current group of vehicles. In operation 1404, the new vehicle may be used in place of one or more vehicles in the original group of vehicles. For example, if the new vehicle is a fuel tanker, this vehicle may be used as one or more of the fuel tankers in the mission. In a similar fashion, if the new vehicle is a support vehicle, this vehicle design may be used to implement one or more of the vehicles used as support vehicles in the mission.

The process identifies a cost for moving the fuel from the starting location to the destination location using the current group of vehicles and personnel used to operate the current group of vehicles (operation 1406). The process compares the first cost to the second cost for moving the fuel from the starting location to the destination location (operation 1408). The second cost is one that uses the group of vehicles and personnel to operate the group of vehicles without the new vehicle.

The process then determines whether a change to the design of the new vehicle is needed based on the comparison (operation 1410).

If a change to the design is not needed, the process terminates. Otherwise, the design of the new vehicle is changed (operation 1412), with the process returning to operation 1402 as described above. This change may involve changing various parameters or features of the vehicle. The change may be performed in the model first and then the changes may be used by fuel cost estimation module 116. In other illustrative examples, particular features about the vehicle may be changed in fuel cost estimation module 116 for running additional simulations and making changes to the model if the cost changes in a desired fashion.

In this manner, new vehicle designs may be analyzed to identify the impact of the use of the new vehicle design on missions for moving fuel. The cost for moving fuel also includes identifying the cost for the new vehicle in addition to the overall cost of the mission. In this manner, changes to designs of a new vehicle may be analyzed to determine whether those designs have a desirable change on the cost for moving fuel in a mission, as well as the cost on the vehicle itself with its role in a mission. As a result, the particular operations and uses of a vehicle in different missions may be identified to provide a better idea of the cost of the vehicle when used in a particular type of mission.

Figure 15:
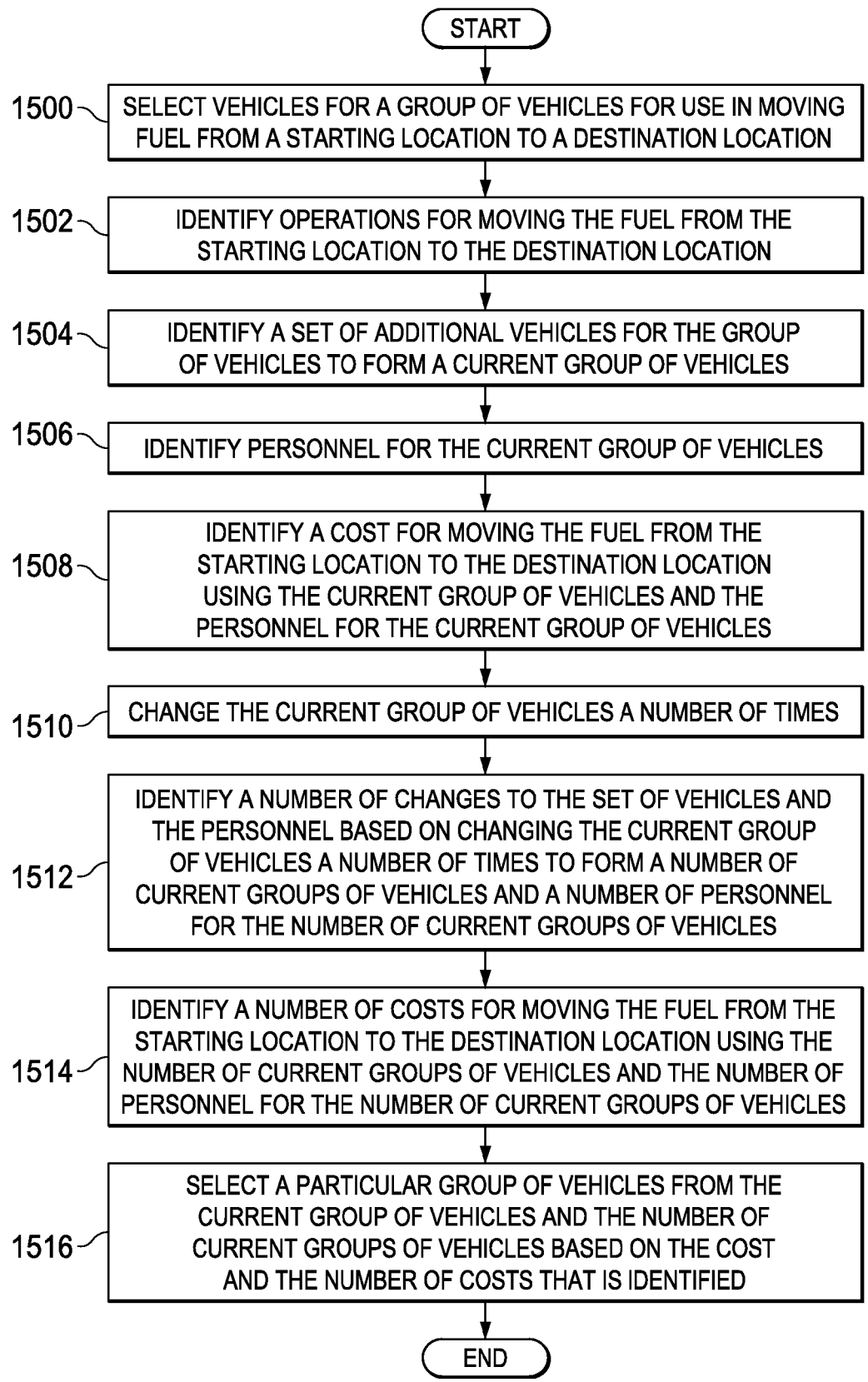
FIG. 15 is an illustration of a flowchart of a process for selecting vehicles for moving fuel in accordance with an advantageous embodiment.

With reference now to FIG. 15, an illustration of a flowchart of a process for selecting vehicles for moving fuel is depicted in accordance with an advantageous embodiment. The flowchart in FIG. 15 is used to identify a group of vehicles for a mission. This identification is performed in a manner to identify a most cost effective combination of vehicles for use in moving fuel. This process is implemented using fuel cost estimation module 116 in FIG. 1.

The process begins by selecting vehicles for a group of vehicles for use in moving fuel from a starting location to a destination location (operation 1500). This operation may be performed through user input that selects vehicles, inputs information about vehicles, or some combination of the two.

The process identifies operations for moving the fuel from the starting location to the destination location (operation 1502). The process identifies a set of additional vehicles for the group of vehicles to form a current group of vehicles (operation 1504). The set of additional vehicles may include one or more additional vehicles or may be a null or empty set. Personnel are identified for the current group of vehicles (operation 1506).

The process then identifies a cost for moving the fuel from the starting location to the destination location using the current group of vehicles and the personnel for the current group of vehicles (operation 1508).

The current group of vehicles is changed a number of times (operation 1510). The process identifies a number of changes to the set of vehicles and the personnel based on changing the current group of vehicles a number of times to form a number of current groups of vehicles and a number of personnel for the number of current groups of vehicles (operation 1512). In this example, each time a current group of vehicles is changed, the change may result in a change to the set of vehicles and the personnel for that group of vehicles. As a result, when the current group of vehicles is changed a number of times, a number of changes to the set of vehicles and the personnel may occur. As a result, each current group of vehicles in the number of current groups of vehicles may have a different composition of vehicles and personnel.

A number of costs is identified for moving the fuel from the starting location to the destination location using the number of current groups of vehicles and the number of personnel for the number of current groups of vehicles (operation 1514). A particular group of vehicles is selected from the current group of vehicles and the number of current groups of vehicles based on the cost and the number of costs that is identified (operation 1516), with the process terminating thereafter.

In operation 1516, the particular group of vehicles may be selected from user input. In still other illustrative examples, the particular group of vehicles may be selected by the process based on the particular group of vehicles providing the lowest cost for moving the fuel. Of course, other factors may be taken into account in addition to cost, depending on the particular implementation.

In this manner, fuel cost estimation module 116 may be used as part of the process and system to identify compositions of vehicles for use in moving fuel that have a desirable cost. This process may be repeated as often as needed to optimize or increase the efficiency in moving fuel from one location to another location. Additionally, this process also may be used to select new vehicles for purchase or decide which vehicles to maintain or retire from use.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 16:
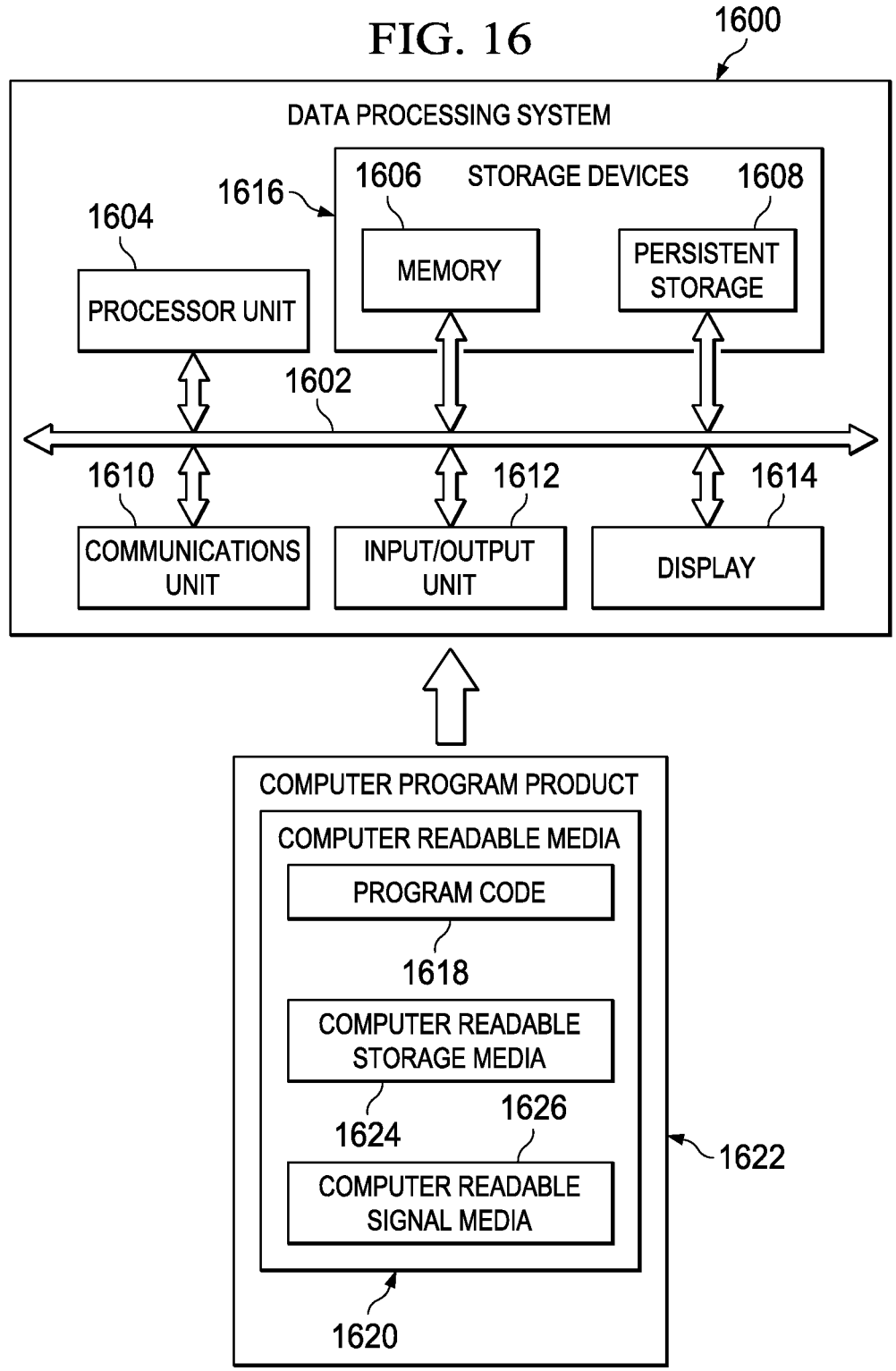
FIG. 16 is an illustration of a data processing system in accordance with an advantageous embodiment.

Turning now to FIG. 16, an illustration of a data processing system is depicted in accordance with an advantageous embodiment. In this illustrative example, data processing system 1600 includes communications fabric 1602, which provides communications between processor unit 1604, memory 1606, persistent storage 1608, communications unit 1610, input/output (I/O) unit 1612, and display 1614. Data processing system 1600 is an example of a data processing system that may be used to implement computer system 112 in FIG. 1. In particular, data processing system 1600 may be used to implemented one or more computers in number of computers 114 in FIG. 1.

Processor unit 1604 serves to execute instructions for software that may be loaded into memory 1606. Processor unit 1604 may be a number of processors, a multi-processor core, or some other type of processor, depending on the particular implementation. A number, as used herein with reference to an item, means one or more items. Further, processor unit 1604 may be implemented using a number of heterogeneous processor systems in which a main processor is present with secondary processors on a single chip. In another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information, such as, for example, without limitation, data, program code in functional form, and/or other suitable information either on a temporary basis and/or a permanent basis. Storage devices 1616 also may be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output unit 1612 allows for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 provides a mechanism to display information to a user.

Instructions for the operating system, applications, and/or programs may be located in storage devices 1616, which are in communication with processor unit 1604 through communications fabric 1602. In these illustrative examples, the instructions are in a functional form on persistent storage 1608. These instructions may be loaded into memory 1606 for execution by processor unit 1604. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626.

Computer readable storage media 1624 may include, for example, an optical or magnetic disk that is inserted or placed into a drive or other device that is part of persistent storage 1608 for transfer onto a storage device, such as a hard drive, that is part of persistent storage 1608. Computer readable storage media 1624 also may take the form of a persistent storage, such as a hard drive, a thumb drive, or a flash memory, that is connected to data processing system 1600. In some instances, computer readable storage media 1624 may not be removable from data processing system 1600.

In these examples, computer readable storage media 1624 is a physical or tangible storage device used to store program code 1618 rather than a medium that propagates or transmits program code 1618. Computer readable storage media 1624 is also referred to as a computer readable tangible storage device or a computer readable physical storage device. In other words, computer readable storage media 1624 is a media that can be touched by a person.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different advantageous embodiments may be implemented in a data processing system including components in addition to or in place of those illustrated for data processing system 1600. Other components shown in FIG. 16 can be varied from the illustrative examples shown. The different advantageous embodiments may be implemented using any hardware device or system capable of running program code. In one illustrative example, the data processing system may include organic components integrated with inorganic components and/or may be comprised entirely of organic components excluding a human being. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1618 may be omitted because the processes for the different embodiments are implemented in a hardware unit.

In still another illustrative example, processor unit 1604 may be implemented using a combination of processors found in computers and hardware units. Processor unit 1604 may have a number of hardware units and a number of processors that are configured to run program code 1618. In this depicted example, some of the processes may be implemented in the number of hardware units, while other processes may be implemented in the number of processors.

In another example, a bus system may be used to implement communications fabric 1602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1606, or a cache, such as found in an interface and memory controller hub that may be present in communications fabric 1602.

Thus, the different advantageous embodiments provide a method and apparatus for estimating a cost for moving fuel. In one advantageous embodiment, a group of vehicles for moving the fuel from a starting location to a destination location is formed from user input. Operations for moving the fuel from the starting location to the destination location are identified from the user input. A set of additional vehicles is identified for the group of vehicles to form a current group of vehicles. Personnel for the current group of vehicles also are identified.

In an advantageous embodiment, vehicles may be selected for purchase, taking into account the cost for using the vehicle to move fuel or provide support for moving fuel. Also, vehicle designs may be modified or adjusted to take into account fuel costs. Further, vehicles may be selected for use in missions in which fuel is moved from one location to another location based on the effect that the selection of different vehicles has on the cost to move the fuel. This and other decisions in which the cost to move fuel is involved may be made using an advantageous embodiment.

The description of the different advantageous embodiments has been presented for purposes of illustration and description and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. A method for estimating a cost for moving fuel, the method comprising:

forming, by a processor, a group of vehicles for moving the fuel from a starting location to a destination location using user input, wherein the group of vehicles is selected from a plurality of heterogeneous vehicles in a vehicle database;

identifying, by the processor, operations for moving the fuel from the starting location to the destination location using the user input;

identifying, by the processor, a set of additional vehicles for the group of vehicles to form a current group of vehicles;

identifying, by the processor, personnel for the current group of vehicles, wherein identifying the personnel comprises identifying first personnel to operate a first vehicle in the current group of vehicles and second personnel to perform maintenance on the first vehicle in the current group of vehicles;

identifying, by the processor, the cost for moving the fuel from the starting location to the destination location using the current group of vehicles and the personnel;

providing, by the processor, an interactive graphical user interface containing display fields, the interactive graphical user interface allowing a user to enter user input into the display fields;

in response to the user input being entered, determining by executing an analysis module associated with the processor, whether the user input meets vehicle ability parameters and safety requirements, the analysis module further configured to warn the user when the user input fails to meet vehicle ability parameters or safety requirements;

providing, by the processor, a vehicle group module generating a vehicle group interface for display in the graphical user interface, the vehicle group interface displaying potential vehicles to the user on the vehicle group interface in the graphical user interface, the vehicle group module forming groups of vehicles in response to receiving the user input; and providing, by the processor, a new vehicle module displaying a new vehicle interface in the graphical user interface, the new vehicle module receiving user input consisting of identifying information about a new vehicle, the identifying information including at least one of the group consisting of a fuel burn rate, a cost of maintenance, a weight of raw vehicle, a standard number of personnel needed to operate new vehicle, and a cost for needed personnel.

2. The method of claim 1 further comprising:

receiving, from the processor, the user input identifying, by the processor, the operations for moving the fuel from the starting location to the destination location, wherein the user input identifies the operations with respect to a number of phases of delivery for moving the fuel from the starting location to the destination location.

3. The method of claim 1, wherein forming, by the processor, the group of vehicles for moving the fuel from the starting location to the destination location using the user input further comprises:

displaying, by the processor, potential vehicles for use in the group of vehicles; and receiving, by the processor, a selection of a number of vehicles from the potential vehicles for use in the group of vehicles in the user input.

4. The method of claim 1 further comprising:
determining, by the processor, whether to purchase the new vehicle based on delivered fuel cost.

5. The method of claim 1 further comprising:
determining, by the processor, whether to change a design for the new vehicle based on delivered fuel cost.

6. The method of claim 1 further comprising:
repeating the steps of forming, by the processor, the group of vehicles for moving the moving the fuel from the starting location to the destination location using the user input;
identifying, by the processor, the operations for moving the fuel from the starting location to the destination location using the user input; identifying, by the processor, the set of additional vehicles for the group of vehicles to form the current group of vehicles; identifying, by the processor, the personnel for the current group of vehicles; and identifying, by the processor, the cost for moving the fuel from the starting location to the destination location using the current group of vehicles and the personnel with different selections of vehicles for the group of vehicles to identify costs for the different selections of vehicles for the group of vehicles.

7. The method of claim 6 further comprising:
selecting, by the processor, a final group of vehicles based on the costs for the different selections of the group of vehicles.

8. The method of claim 1, wherein identifying, by the processor, the personnel for the current group of vehicles comprises:
identifying, by the processor, a set of personnel for the first vehicle in the current group of vehicles.

9. The method of claim 1, wherein a first operation in the operations is selected from one of unloading the fuel at the destination location, loading the fuel at the starting location, loading a portion of the fuel at a waypoint between the starting location and the destination location, refueling the group of vehicles, traveling to the destination location, and traveling to the waypoint.

10. The method of claim 1, wherein the set of additional vehicles comprises at least one of a set of transportation vehicles configured to move the fuel and a set of support vehicles.

11. The method of claim 1, wherein the user input is entered at a time selected from the group consisting of before moving the fuel, while moving the fuel, and after moving the fuel.

12. The method of claim 1, wherein a vehicle in the heterogeneous vehicles is selected from one of a land vehicle, a water vehicle, an air vehicle, a space vehicle, an aircraft, an unmanned aerial vehicle, a tank, a tanker, a truck, a ship, a submarine, and a refueling aircraft.

13. A method for identifying fuel costs for operating vehicles, the method comprising:
forming, by a processor, a group of vehicles for moving fuel from a starting location to a destination location using user input, wherein the group of vehicles is selected from a plurality of heterogeneous vehicles and wherein the group of vehicles includes a vehicle under consideration;
identifying, by the processor, operations for moving the fuel from the starting location to the destination location using the user input;
identifying, by the processor, a set of additional vehicles for the group of vehicles to form a current group of vehicles;
identifying, by the processor, personnel for the current group of vehicles;
identifying, by the processor, a first cost for moving the fuel from the starting location to the destination location using the current group of vehicles and the personnel, wherein the first cost includes a second cost for the vehicle under consideration;
determining, by the processor, whether to use the vehicle under consideration based on the second cost for the vehicle under consideration;
responsive to an absence of a determination to use the vehicle under consideration, performing, by the processor, at least one of the group consisting of changing a first design for the vehicle under consideration to a second design, different than the first design, and selecting a new vehicle for consideration;
providing, by the processor, an interactive graphical user interface containing display fields, the interactive graphical user interface allowing a user to enter user input into the display fields;
in response to the user input being entered, determining by executing an analysis module associated with the processor, whether the user input meets vehicle ability parameters and safety requirements, the analysis module further configured to warn the user when the user input fails to meet vehicle ability parameters or safety requirements;
providing, by the processor, a vehicle group module generating a vehicle group interface for display in the graphical user interface, the vehicle group interface displaying potential vehicles to the user on the vehicle group interface in the graphical user interface, the vehicle group module forming groups of vehicles in response to receiving the user input; and
providing, by the processor, a new vehicle module displaying a new vehicle interface in the graphical user interface, the new vehicle module receiving user input consisting of identifying information about a new vehicle, the identifying information including at least one of the group consisting of a fuel burn rate, a cost of maintenance, a weight of raw vehicle, a standard number of personnel needed to operate new vehicle, and a cost for needed personnel.

14. A cost estimation system comprising:
a computer system; and
a fuel cost estimation module configured to run on the computer system; receive user input identifying a group of vehicles for moving fuel from a starting location to a destination location, wherein the group of vehicles is selected from a plurality of heterogeneous vehicles in a vehicle database; identify operations for moving the fuel from the starting location to the destination location using the user input; identify a set of additional vehicles for the group of vehicles to form a current group of vehicles; identify personnel for the current group of vehicles;
and identify a cost for moving the fuel from the starting location to the destination location using the current group of vehicles and the personnel, wherein the fuel cost estimation module further comprises:
an interactive graphical user interface containing display fields, the interactive graphical user interface allowing a user to enter user input into the display fields;
an analysis module associated with the processor, which determines whether the user input meets vehicle ability parameters and safety requirements, the analysis module further configured to warn the user when the user input fails to meet vehicle ability parameters or safety requirements;

a vehicle group module generating a vehicle group interface for display in the graphical user interface, the vehicle group interface displaying potential vehicles to the user on the vehicle group interface in the graphical user interface, the vehicle group module forming groups of vehicles in response to receiving the user input; and a new vehicle module displaying a new vehicle interface in the graphical user interface, the new vehicle module receiving user input consisting of identifying information about a new vehicle, the identifying information including at least one of the group consisting of a fuel burn rate, a cost of maintenance, a weight of raw vehicle, a standard number of personnel needed to operate new vehicle, and a cost for needed personnel.

15. A method comprising:

identifying, by a processor, a new vehicle having a first design;

selecting, by the processor, a first group of vehicles having a mission aimed at moving fuel from a starting location to a destination location, the first group of vehicles being selected from a plurality of heterogeneous vehicles in a vehicle database;

combining, by the processor, the new vehicle with the first group of vehicles having the mission, to form a current group of vehicles;

identifying, by the processor, a first cost for moving the fuel from the starting location to the destination location using the current group of vehicles and a first number of personnel to operate the current group of vehicles;

comparing, by the processor, the first cost to a second cost for moving the fuel from the starting location to the destination location, wherein the second cost uses the first group of vehicles not including the new vehicle, and a second number of personnel to operate the first group of vehicles to form a comparison;

determining, by the processor, whether to change the first design of the new vehicle to a second design, different than the first design, based on the comparison;

providing, by the processor, an interactive graphical user interface containing display fields, the interactive graphical user interface allowing a user to enter user input into the display fields;

in response to the user input being entered, determining by executing an analysis module associated with the processor, whether the user input meets vehicle ability parameters and safety requirements, the analysis module further configured to warn the user when the user input fails to meet vehicle ability parameters or safety requirements;

providing, by the processor, a vehicle group module generating a vehicle group interface for display in the graphical user interface, the vehicle group interface displaying potential vehicles to the user on the vehicle group interface in the graphical user interface, the vehicle group module forming groups of vehicles in response to receiving the user input; and providing, by the processor, a new vehicle module displaying a new vehicle interface in the graphical user interface, the new vehicle module receiving user input consisting of identifying information about a new vehicle, the identifying information including at least one of the group consisting of a fuel burn rate, a cost of maintenance, a weight of raw vehicle, a standard number of personnel needed to operate new vehicle, and a cost for needed personnel.

16. The method of claim 15, wherein the first cost includes a third cost for the new vehicle.

17. The method of claim 15, wherein the mission is selected from the group consisting of an existing mission and a new mission defined by user input using the processor.

18. A method for selecting vehicles for moving fuel, the method comprising:

selecting, by a processor, the vehicles for a first group of vehicles used to move the fuel from a starting location to a destination location using user input, the first group of vehicles being selected from a plurality of heterogeneous vehicles in a vehicle database;

identifying, by the processor, operations for moving the fuel from the starting location to the destination location;

identifying, by the processor, a set of additional vehicles for the first group of vehicles to form a current group of vehicles;

identifying, by the processor, personnel for the current group of vehicles;

identifying, by the processor, a first cost for moving the fuel from the starting location to the destination location using the current group of vehicles and the personnel for the current group of vehicles;

changing, by the processor, the current group of vehicles a number of times;

identifying, by the processor, a number of changes to the set of additional vehicles and a number of changes to the personnel based on changing the current group of vehicles the number of times to form a number of current groups of vehicles and a number of personnel for the number of current groups of vehicles; identifying, by the processor, a number of costs for moving the fuel from the starting location to the destination location using the number of current groups of vehicles and the number of personnel for the number of current groups of vehicles;

providing, by the processor, an interactive graphical user interface containing display fields, the interactive graphical user interface allowing a user to enter user input into the display fields;

in response to the user input being entered, determining by executing an analysis module associated with the processor, whether the user input meets vehicle ability parameters and safety requirements, the analysis module further configured to warn the user when the user input fails to meet vehicle ability parameters or safety requirements;

providing, by the processor, a vehicle group module generating a vehicle group interface for display in the graphical user interface, the vehicle group interface displaying potential vehicles to the user on the vehicle group interface in the graphical user interface, the vehicle group module forming groups of vehicles in response to receiving the user input; and providing, by the processor, a new vehicle module displaying a new vehicle interface in the graphical user interface, the new vehicle module receiving user input consisting of identifying information about a new vehicle, the identifying information including at least one of the group consisting of a fuel burn rate, a cost of maintenance, a weight of raw vehicle, a standard number of personnel needed to operate new vehicle, and a cost for needed personnel.

19. The method of claim 18 further comprising:
selecting, by the processor, a particular group of vehicles from one of the current group of vehicles and the number of current groups of vehicles based on the first cost and the number of costs.

* * * * *